United States Patent
Lamontagne

(10) Patent No.: US 11,934,032 B2
(45) Date of Patent: Mar. 19, 2024

(54) MOUNTING OF OPTICAL ELEMENTS IN A BARREL USING A RESILIENT SPACER

(71) Applicant: INSTITUT NATIONAL D'OPTIQUE, Québec (CA)

(72) Inventor: Frédéric Lamontagne, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 514 days.

(21) Appl. No.: 17/149,096

(22) Filed: Jan. 14, 2021

(65) Prior Publication Data
US 2021/0215899 A1 Jul. 15, 2021

Related U.S. Application Data

(60) Provisional application No. 62/960,845, filed on Jan. 14, 2020.

(51) Int. Cl.
*G02B 7/02* (2021.01)
*G02B 27/42* (2006.01)
*G03B 17/12* (2021.01)

(52) U.S. Cl.
CPC ............ *G02B 7/026* (2013.01); *G02B 7/022* (2013.01); *G02B 27/4233* (2013.01); *G03B 17/12* (2013.01)

(58) Field of Classification Search
CPC .............. A61G 2220/145; B62K 5/007; G02B 27/4233; G02B 7/022; G02B 7/026; G03B 17/12
See application file for complete search history.

(56) References Cited

U.S. PATENT DOCUMENTS

| 2008/0138060 A1* | 6/2008 | Chang ................. G02B 7/08 396/529 |
| 2015/0131175 A1 | 5/2015 | Lamontagne et al. |
| 2016/0084281 A1* | 3/2016 | Lamontagne .......... G02B 7/026 248/314 |
| 2020/0264402 A1 | 8/2020 | Savard et al. |

FOREIGN PATENT DOCUMENTS

DE   102017117834 B3   10/2018

OTHER PUBLICATIONS

International Search Report issued in corresponding application PCT/CA2021/050033 dated Apr. 15, 2021.
Lamontagne, Frédéric, "Optomechanical Tolerancing and Error Budgets", in the Handbook of Optomechanical Engineering, CRC Press, 2017, pp. 207-268).

* cited by examiner

*Primary Examiner* — Thomas K Pham
(74) *Attorney, Agent, or Firm* — Dinsmore & Shohl LLP

(57) ABSTRACT

Optical assemblies having a barrel and one or more optical elements mounted therein are provided. The optical assembly includes a resilient spacer positioned between two consecutive ones of the components mounted in the barrel. In typical implementations, the contacting surface of either one of the components adjacent to the resilient spacer is precisely centered relative to the center axis of the cavity of the barrel. Furthermore, an outwardly-directed resulting force is applied to the resilient spacer by its engagements with the adjacent components.

14 Claims, 18 Drawing Sheets

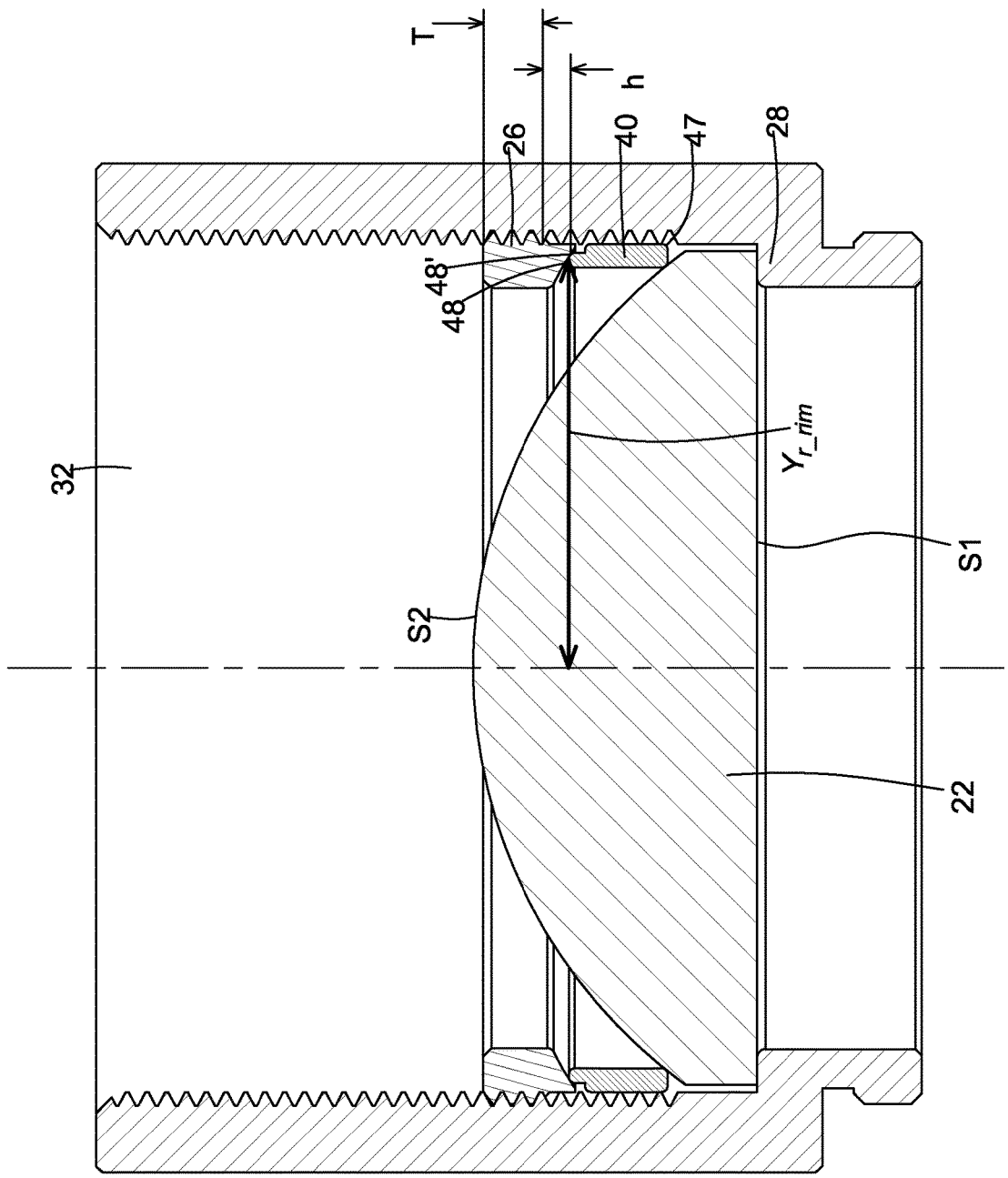

MOUNTING OF OPTICAL ELEMENTS IN A BARREL USING A RESILIENT SPACER

CROSS-REFERENCE TO RELATED APPLICATIONS

This application claims the benefit of U.S. Provisional Application Ser. No. 62/960,845 filed on Jan. 14, 2020 and entitled RESILIENT SPACER FOR THE MOUNTING OF OPTICAL ELEMENTS IN A BARREL, which is hereby incorporated by reference in its entirety.

TECHNICAL FIELD

The technical field generally relates to opto-mechanical systems.

BACKGROUND

Optical elements or components are omnipresent in devices, systems or arrangements where light needs to be directed, expanded, focused, collimated or otherwise transformed or affected. Optical elements can for example be embodied by lenses, mirrors, Diffractive Optical Elements (DOE), assemblies thereof, or the like.

In a typical optical system, most or all optical elements usually need to be precisely positioned and aligned in order to properly perform their intended optical function. This positioning and alignment typically involve securing the optical element in a holder or mount of some sort. Proper alignment of an optical element with respect to the holder is a delicate operation that generally requires tight manufacturing tolerances and careful handling.

Barrels are well known types of mechanical holders for optical elements. Barrels typically define a cylindrical cavity in which one or more optical elements are mounted. By way of example, a lens is a type of optical element that is often mounted in barrels. A lens generally needs to be centered with a precision that can be of the order of a few micrometers. Opto-mechanical assemblies in which lenses are mounted and precisely centered are known in the art. Referring to FIG. 1A (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically threaded within the barrel 24 and abuts on the surface S2 of the lens 22 opposite to the lens seat 28, thus securing the lens 22 in the assembly 20. It is well known in the art that the lens is centered when both centers of curvature C1 and C2 lie on the center axis B of the barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal expansion of the lens and barrel materials also impacts on the centering of the lens. Manufacturing tolerances on dimensions of the components of the assembly such as the diameter of the lens, the diameter of the barrel cavity and the differences in thickness along the edge of the lens also affect the quality of the centering. The greater the precision required on the centering of the lens, the greater the manufacturing costs of both lens and barrel.

In optical assemblies involving a plurality of lenses mounted in a stack inside a barrel, it is common practice to use spacers between consecutive ones of theses lenses. The spacer has opposite surfaces in contact with the two adjacent lenses, and therefore determines the spacing between these lenses. As manufacturing tolerances on the thickness of a lens is difficult to control with a high degree of precision, the use of a spacer provides a better control on the distance between two lenses. The alignment of the spacer however has an impact on the tilt and centering of the lenses. By way of example, FIG. 1B (PRIOR ART) illustrates the impact that the radial play between the interior diameter of a barrel and the opto-mechanical elements mounted in this barrel can have on the centering and tilt of the lenses (see Lamontagne, Frédéric. "Optomechanical Tolerancing and Error Budgets", in the *Handbook of Optomechanical Engineering*, CRC Press, 2017, pp. 207-268).

There remains a need for an optical configuration using spacers that alleviates at least some of the drawbacks of the prior art.

SUMMARY

In accordance with one aspect, there is provided an optical assembly, comprising:
  a barrel having an inner wall and including a cavity having a center axis;
  a plurality of components mounted sequentially in the cavity of the barrel, the plurality of components including at least one optical element; and
  a resilient spacer provided between a pair of consecutive ones of said components and having a cylindrical wall and opposite frontward and rearward rims, the resilient spacer being resiliently deformable between a compressed state allowing the insertion thereof within the cavity, and a biased state in which the cylindrical wall of the resilient spacer contacts the inner wall of the barrel;
  wherein the pair of consecutive ones of said components comprises a forward component and a rearward component, the forward component having a rearward periphery comprising a spacer-mounting surface in engagement with the frontward rim of the resilient spacer, and the rearward component has a forward periphery comprising a spacer-abutting surface in engagement with the rearward rim of the resilient spacer, one of the spacer-mounting surface and the spacer-abutting surface being precisely centered relative to the center axis of the cavity;
  wherein an outwardly-directed resulting force is applied to the resilient spacer by the engagements of the frontward and rearward rims with the spacer-mounting surface and the spacer-abutting surface, respectively.

In some implementations, the resilient spacer comprises a slit extending through a portion of the cylindrical wall along a length thereof. The resilient spacer may be made of a resilient material selected from the group consisting of metals and plastics.

In some implementations, the plurality of components comprises, successively:
  a first optical element of said at least one optical element;
  a first retaining ring defining the forward component of the pair of consecutive ones of said components, the spacer-mounting surface of the first retaining ring being precisely centered within the cavity;
  a second optical element of said at least one optical element, defining the rearward component of the pair of consecutive ones of said components; and
  a second retaining ring.

The first optical element is secured between the first retaining ring and a seat provided in said cavity, and the second optical element is secured between the second retaining ring and the resilient spacer. In one variant, the frontward rim of the resilient spacer comprises a frontward rim edge engaging the spacer-mounting surface of the first retaining ring along a circular edge contact line. The first retaining ring may be affixed to the barrel through a set of ring threads complementary to a set of barrel threads provided in the cavity. The spacer-mounting surface of the first retaining ring may have a frustro-spherical profile having a radius of curvature $R_{Ring\_rear}$ given by the formula:

$$R_{Ring\_rear} = \sqrt{\left[\frac{d_{ring}}{2\tan(\varphi_{threads}/2)} + h' + T/2\right]^2 + Y_{f\_rim}^2}$$

where:
  $d_{ring}$ is a diameter of the first retaining ring along the ring threads;
  $\varphi_{thread}$ is a value of a thread angle of the ring threads;
  $Y_{f\_rim}$ is a half-diameter of the frontward rim edge;
  h' is a distance between (i) a first point of contact of the barrel threads with the ring threads proximate to the resilient spacer and (ii) the edge contact line; and
  T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

In another variant, the first retaining ring may again be affixed to the barrel through a set of ring threads complementary to a set of barrel threads provided in the cavity, and the spacer-mounting surface of the first retaining ring has a frustro-conical profile having an inclination angle α' with respect to a plane perpendicular to the center axis of the cavity given by the formula:

$$\alpha' = \sin^{-1}\left(\frac{Y_{f\_rim}}{\sqrt{\left[\frac{d_{ring}}{2\tan(\varphi_{threads}/2)} + h' + T/2\right]^2 + Y_{f\_rim}^2}}\right)$$

where:
  $Y_{f\_rim}$ is a half-diameter of the frontward rim edge;
  $d_{ring}$ is a diameter of the first retaining ring along the ring threads;
  $\varphi_{thread}$ is a value of a thread angle of the ring threads;
  h' is a distance between (i) a first point of contact of the barrel threads with the ring threads proximate to the resilient spacer and (ii) the edge contact line; and
  T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

In some implementations, the plurality of components comprises, successively:
  a first optical element of the at least one optical element, defining the forward component of the pair of consecutive ones of said components, the spacer-mounting surface of the first optical element being precisely centered within the cavity;
  a second optical element of the at least one optical element, defining the rearward component of the pair of consecutive ones of said components; and
  a retaining ring.

The first optical element is secured between the resilient spacer and a seat provided in said cavity, and the second optical element is secured between the retaining ring and the resilient spacer. The optical assembly may further include an adhesive fixing the first optical element in the cavity.

In some implementations, the plurality of components comprises, successively:
  an optical element of the at least one optical element, defining the forward component of the pair of consecutive ones of said components; and
  a retaining ring defining the rearward component of the pair of consecutive ones of said components.

The optical element is secured between the resilient spacer and a seat provided in said cavity, the rearward rim of the resilient spacer comprising a rearward rim edge engaging the spacer-abutting surface of the retaining ring along a circular edge contact line precisely centered within the cavity. In one variant, the retaining ring may be affixed to the barrel through a set of ring threads complementary to a set of barrel threads provided in the cavity, and the spacer-abutting surface of the retaining ring has a frustro-spherical profile having a radius of curvature $R_{Ring\_forward}$ given by the formula:

$$R_{Ring\_forward} = \sqrt{\left[\frac{d_{ring}}{2\tan(\varphi_{threads}/2)} - h - T/2\right]^2 + Y_{r\_rim}^2}$$

where:
  $d_{ring}$ is a diameter of the retaining ring along the ring threads;
  $\varphi_{thread}$ is a value of a thread angle of the ring threads;
  $Y_{r\_rim}$ is a half-diameter of the rearward rim edge;
  h is a distance between (i) a first point of contact of the barrel threads with the ring threads proximate to the resilient spacer and (ii) the edge contact line; and
  T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

In another variant, the retaining ring may again be affixed to the barrel through a set of ring threads complementary to a set of barrel threads provided in the cavity, and the spacer-abutting surface of the retaining ring has a frustro-conical profile having an inclination angle α with respect to a plane perpendicular to the center axis of the cavity given by the formula:

$$\alpha = \sin^{-1}\left(\frac{Y_{r\_rim}}{\sqrt{\left[\frac{d_{ring}}{2\tan(\varphi_{threads}/2)} - h' - T/2\right]^2 + Y_{r\_rim}^2}}\right)$$

where:
  $Y_{r\_rim}$ is a half-diameter of the rearward rim edge;
  $d_{ring}$ is a diameter of the retaining ring along the ring threads;
  $\varphi_{thread}$ is a value of a thread angle of the ring threads;

h is a distance between (i) a first point of contact of the barrel threads with the ring threads proximate to the resilient spacer and (ii) the edge contact line; and T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

In some implementations, at least one of the spacer-mounting surface and the spacer-abutting surface is convex. In some implementations, each one of the spacer-mounting surface and the spacer-abutting surface is convex.

In accordance with another aspect, there is provided a kit for precisely centering an optical element mounted in a barrel having an inner wall and including a cavity having a center axis, the barrel being provided with a set of barrel threads, the kit comprising:

a resilient spacer having a cylindrical wall and opposite frontward and rearward rims, the frontward rim being engageable with a spacer-mounting surface at a rearward periphery of the optical element, the rearward rim comprising a rearward rim edge, the resilient spacer being resiliently deformable between a compressed state allowing the insertion thereof within the cavity, and a biased state in which the cylindrical wall of the resilient spacer contacts the inner wall of the barrel; and a retaining ring having a set of ring threads complementary to the barrel threads, the retaining ring having a forward periphery comprising a spacer-abutting surface engageable with the rearward rim edge of the rearward rim of the resilient spacer along a circular edge contact line precisely centered within the cavity when the retaining ring is screwed within the barrel;

wherein the spacer-abutting surface has an orientation at the circular edge contact line ensuring that, in use, an outwardly-directed resulting force is applied to the resilient spacer.

In some implementations, the spacer-abutting surface of the retaining ring has a frustro-spherical profile having a radius of curvature $R_{Ring\_forward}$ given by the formula:

$$R_{Ring\_forward} = \sqrt{\left[\frac{d_{ring}}{2\tan(\varphi_{threads}/2)} - h - T/2\right]^2 + Y_{r\_rim}^2}$$

where:

$d_{ring}$ is a diameter of the retaining ring along the ring threads;

$\varphi_{thread}$ is a value of a thread angle of the ring threads;

$Y_{r\_rim}$ is a half-diameter of the rearward rim edge;

h is a distance, in use, between (i) a first point of contact of the barrel threads with the ring threads proximate to the resilient spacer and (ii) the edge contact line; and T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact.

In some implementations, the spacer-abutting surface of the retaining ring has a frustro-conical profile having an inclination angle $\alpha'$ with respect to a plane perpendicular to the center axis of the cavity given by the formula:

where:

$$\alpha' = \sin^{-1}\left(\frac{Y_{r\_rim}}{\sqrt{\left[\frac{d_{ring}}{2\tan(\varphi_{threads}/2)} - h - T/2\right]^2 + Y_{r\_rim}^2}}\right)$$

$Y_{r\_rim}$ is a half-diameter of the rearward rim edge;

$d_{ring}$ is a diameter of the retaining ring along the ring threads;

$\varphi_{thread}$ is a value of a thread angle of the ring threads;

h is a distance, in use, between (i) a first point of contact of the barrel threads with the ring threads proximate to the resilient spacer and (ii) the edge contact line; and T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact.

In accordance with yet another implementation, there is provided a kit for mounting first and second optical elements in a spaced relationship in a barrel having an inner wall and including a cavity having a center axis, the barrel being provided with a set of barrel threads, the kit comprising:

a first retaining ring configured for securing the first optical element against a seat provided in the cavity, the first retaining ring having a rearward periphery comprising a spacer-mounting surface precisely centered within the cavity when mounted therein;

a resilient spacer having a cylindrical wall and opposite frontward and rearward rims, the resilient spacer being resiliently deformable between a compressed state allowing the insertion thereof within the cavity, and a biased state in which the cylindrical wall of the resilient spacer contacts the inner wall of the barrel, the frontward rim of the resilient spacer being engageable with the spacer-mounting surface of the first retaining ring along a circular edge contact line;

wherein the rearward rim of the resilient spacer is configured to engage a spacer-abutting surface of the second optical element when the second optical element is inserted in the cavity rearwardly of the resilient spacer and mounted in said cavity using a second retaining ring; and wherein the spacer-mounting surface has an orientation at the circular edge contact line ensuring that, in use, an outwardly-directed resulting force is applied to the resilient spacer.

In some implementations, the first retaining ring comprises a set of ring threads complementary to the set of barrel threads, and the spacer-mounting surface of the first retaining ring has a frustro-spherical profile having a radius of curvature $R_{Ring\_rear}$ given by the formula:

$$R_{Ring\_rear} = \sqrt{\left[\frac{d_{ring}}{2\tan(\varphi_{threads}/2)} + h' + T/2\right]^2 + Y_{f\_rim}^2}$$

where:

$d_{ring}$ is a diameter of the first retaining ring along the ring threads;

$\varphi_{thread}$ is a value of a thread angle of the ring threads;

$Y_{f\_rim}$ is a half-diameter of the frontward rim edge;

h' is a distance, in use, between (i) a first point of contact of the barrel threads with the ring threads proximate to the resilient spacer and (ii) the edge contact line; and T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact.

In some implementations, the first retaining ring comprises a set of ring threads complementary to the set of barrel threads, and the spacer-mounting surface of the first retaining ring has a frustro-conical profile having an inclination angle α' with respect to a plane perpendicular to the center axis of the cavity given by the formula:
where:

$$\alpha' = \sin^{-1}\left(\frac{Y_{f\_rim}}{\sqrt{\left[\frac{d_{ring}}{2\tan(\varphi_{threads}/2)} + h' + T/2\right]^2 + Y_{f\_rim}^2}}\right)$$

$Y_{f\_rim}$ is a half-diameter of the frontward rim edge;
$d_{ring}$ is a diameter of the first retaining ring along the ring threads;
$\varphi_{thread}$ is a value of a thread angle of the ring threads;
h' is a distance, in use, between (i) a first point of contact of the barrel threads with the ring threads proximate to the resilient spacer and (ii) the edge contact line; and
T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact.

In accordance with one aspect, there is provided an optical assembly comprising a barrel and a plurality of optical elements mounted therein. The optical assembly includes a resilient spacer positioned between two consecutive ones of the optical elements mounted in the barrel. In typical implementations, a first one of the optical elements is mounted and precisely aligned in the cavity, and the spacer provides a precisely centered support for the second one of the optical elements.

In accordance with one aspect, there is provided an optical assembly including a barrel having a cavity. A first and a second optical element are mounted within the cavity. A first and a second retaining ring respectively secure the first and second optical element within the cavity. A seat is provided in the cavity, and the first optical element is secured between the seat and the first retaining ring. A resilient spacer is provided between the first retaining ring and the second optical element. The second optical element is secured between the resilient spacer and the second retaining ring.

Advantageously, in some embodiments the resilient spacer provides an accurate control of the distance between the two optical elements. The spacer also acts as a precision seat on which the second optical element abuts.

In accordance with another aspect, there is provided a resilient spacer for spacing two consecutive optical elements mounted in a cavity of a barrel. The resilient spacer has a generally cylindrical shape including a cylindrical wall having a height h, and opposite rims. The resilient spacer is resiliently deformable to a compressed state in which its outer dimensions allows its insertion within the cavity, and a biased state in which the cylindrical wall of the resilient spacer has an expended diameter and contacts an inner wall of the barrel.

Advantageously, when in the compressed state the resilient spacer can be slid into the cavity until it reaches the desired position. Once released from the compressed state, the spring constant of the resilient spacer tends to bias the resilient spacer outwardly, so that the outer surface of the cylindrical wall presses against the inner wall of the barrel, therefore eliminating any lateral play on the position of the resilient spacer.

In accordance with one implementation, the resilient spacer may include a slit machined through a portion of the cylindrical wall along the full length h.

In some implementation, the resilient spacer is made of a resilient material such as metals or plastics.

In accordance with another aspect, there is provided a method of mounting a plurality of optical elements within a barrel. The barrel includes a cavity having a center axis, an inner wall and further includes a seat. The method includes:
  a) securing a first one of the optical elements between the seat and a first retaining ring, the first retaining ring defining a spacer mounting surface opposite the first one of the optical elements, the spacer mounting surface being precisely aligned with respect to the center axis of the cavity;
  b) compressing a resilient spacer into a compressed state and inserting said resilient spacer into the cavity until a frontward rim thereof abuts on the spacer mounting surface, and releasing said resilient spacer from the compressed state so that it expands to a biased state wherein the resilient spacer presses against the inner wall of the barrel; and
  c) inserting a second one of the optical elements into the cavity until a first surface thereof abuts on a rearward facing rim of the resilient spacer, and securing said second one of the optical elements with a second retaining ring;
wherein an engagement of the frontward and rearward rims of the spacer with the spacer mounting surface and first surface of the second optical element apply an outward resulting force to the resilient spacer.

Other features and advantages of the invention will be better understood upon a reading of embodiments thereof with reference to the appended drawings.

BRIEF DESCRIPTION OF THE DRAWINGS

FIG. 11 shows the used of a resilient spacer to enable the edge mounting in the situation of FIG. 10.

DETAILED DESCRIPTION

Figure 1A:
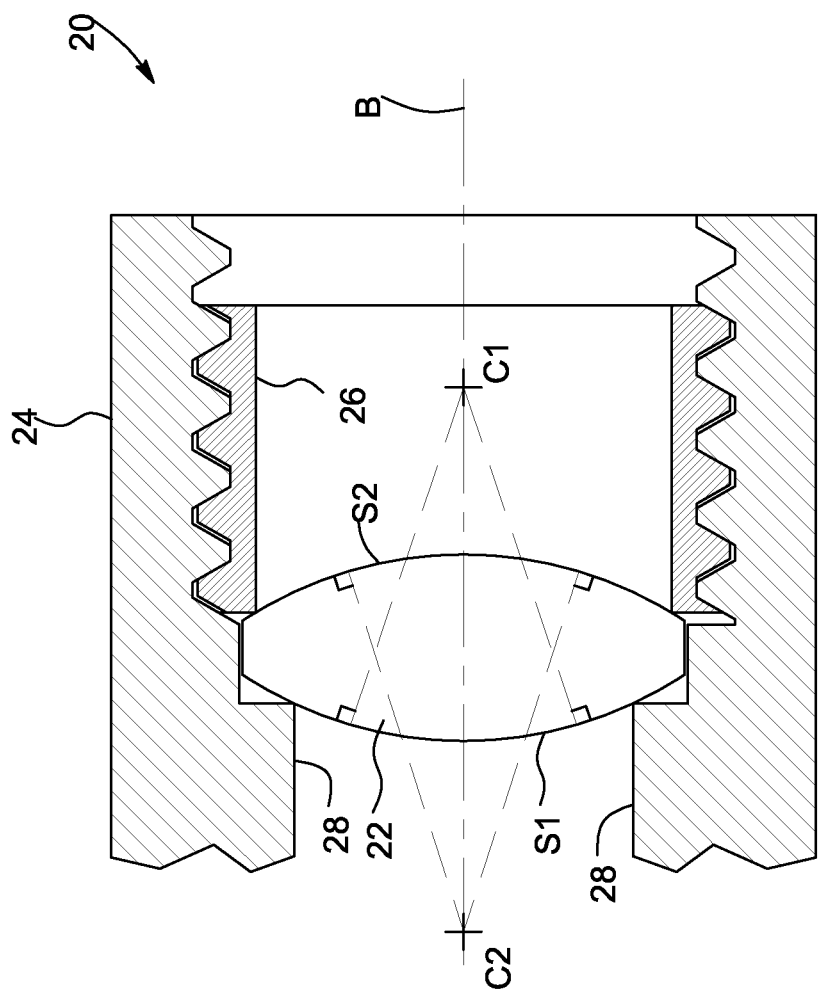
FIGS. 1A and 1B (PRIOR ART) illustrate the mounting of optical elements in barrels according to prior art.

The description below is directed to optical assemblies including optical elements mounted and centered in a barrel using resilient spacers. In some implementations, a pair of consecutive optical elements is separated by a resilient spacer. In some implementations, the resilient spacer may be used between an optical element and an associated retaining ring. Embodiments of the invention relate to optical assemblies and to kits for mounting optical elements within barrels using such spacers.

In accordance with one aspect, a resilient spacer is positioned between two consecutive optical elements mounted in a barrel. In typical implementations, a first one of the optical elements is mounted and precisely aligned in the cavity, and the spacer provides a precisely centered support for the second one of the optical elements. The spacer further provides for a precise control of the distance between the two optical elements.

Referring to FIGS. 2 and 2A to 2C, there is shown an optical assembly 20 according to one implementation. The optical assembly 20 generally includes a barrel 24 having an inner wall 34 and including a cavity 32 having a center axis B. The optical assembly 20 includes a plurality of components mounted sequentially in the cavity 32 of the barrel 24. The plurality of components includes at least one optical element 22, such as, in the example of FIG. 2, a first and a second optical element 22a and 22b, and associated first and second retaining ring 26a, 26b securing the optical elements 22a, 22b in the cavity 32. In the illustrated example of FIG. 2, a seat 28 is provided in the cavity 32, and the first optical element 22a is secured between this seat 28 and the first retaining ring 26a.

Figure 2:
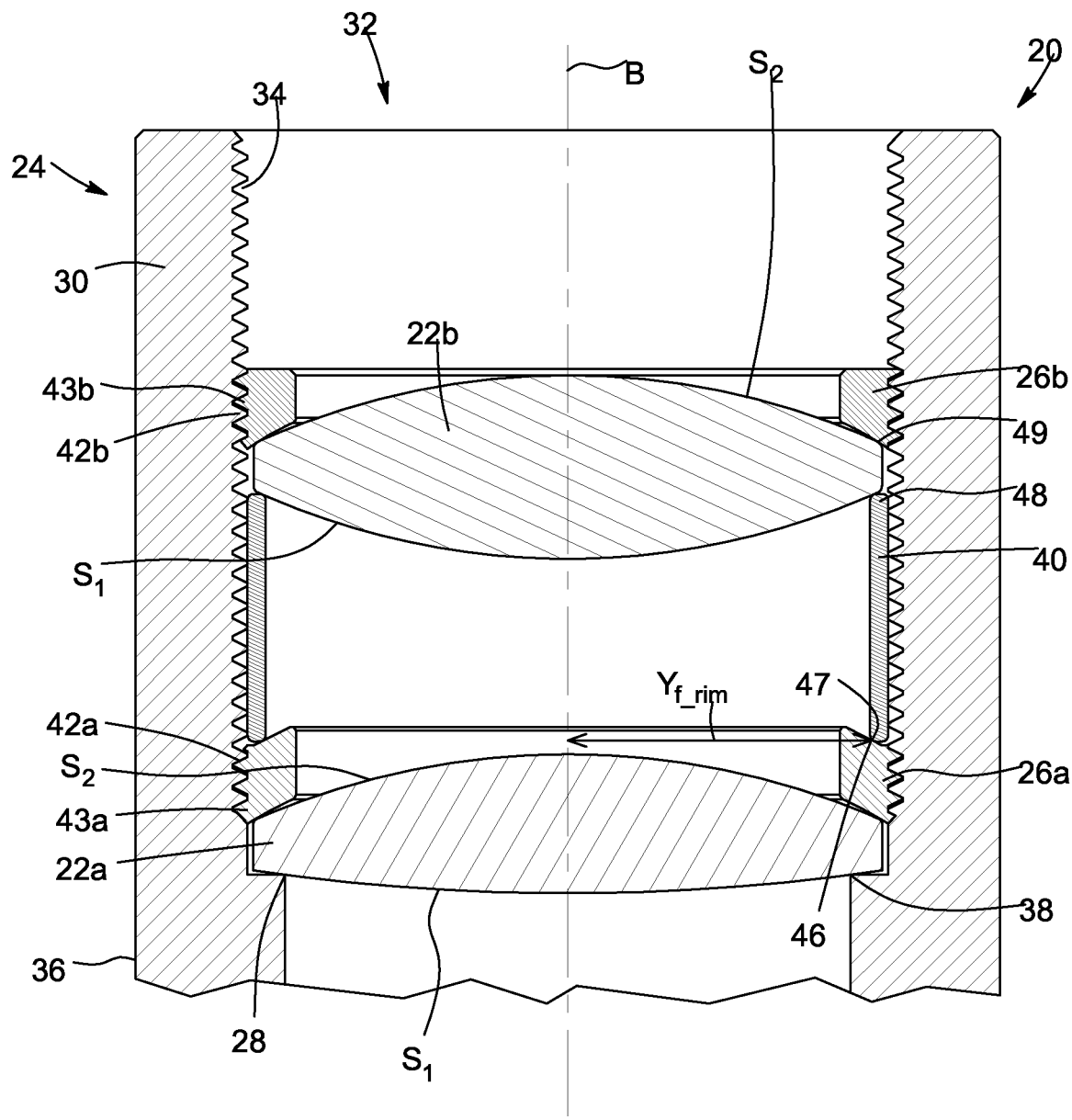
FIG. 2 is a schematic cross-sectional side view of an optical assembly including two optical elements separated by a resilient spacer according to one embodiment.

A resilient spacer 40 is provided between a pair of consecutive ones of the components, and is shown between the first retaining ring 26a and the second optical element 22b in FIG. 2, such that the second optical element 22b is secured between the second retaining ring 26b and the resilient spacer 40. The resilient spacer 40 has a cylindrical wall 45 (see FIG. 2B) and opposite frontward and rearward rims 47 and 48. The resilient spacer 40 is resiliently deformable between a compressed state allowing its insertion within the cavity 32, and a biased state in which the cylindrical wall 45 of the resilient spacer 40 contacts the inner wall 34 of the barrel 24. As described in more details below, the resilient spacer 40 provides an accurate control of the distance between the two optical elements 22a and 22b, as well as acts as a precision seat on which the second optical element 22b abuts.

It will be readily understood that while the illustrated example of FIG. 2 shows only two optical elements 22a and 22b separated by one spacer 40, in other embodiments various combinations of optical elements and spacers may be provided. In some implementations, three or more optical elements may be mounted in a cascade configuration inside a same barrel, each pair of consecutive optical elements being separated by a spacer as described herein. Alternatively, only one pair of consecutive optical elements, or only some of the pairs of consecutive optical elements within a cascade may be separated by a spacer as described herein.

The pair of consecutive components separated by the resilient spacer may be designated as the forward component and the rearward component, the forward and rearward directions being conventionally dictated by the order in which components are inserted inside the cavity. The resilient spacer 40 can be described as "sandwiched" between the forward and rearward components. Therefore, in the example of FIG. 2 the forward component is defined or embodied by the first retaining ring 26a, whereas the rearward component is defined or embodied by the second optical element 22b. The forward component has a rearward periphery which includes a spacer-mounting surface 46 in engagement with the frontward rim 47 of the resilient spacer 40, and the rearward component has a forward periphery comprising a spacer-abutting surface 49 in engagement with the rearward rim 48 of the resilient spacer 40.

As explained further below, it has been found by the inventors that the combination of the two following conditions may provide for the precise centering of the resilient spacer 40 within the cavity: firstly, either the spacer-mounting surface 46 or the spacer-abutting surface 49 is precisely centered relative to the center axis B of the cavity 32, for example using techniques known in the art; and secondly, an outwardly-directed resulting force is applied to the resilient spacer 40 by the engagements of the frontward and rearward rims 47 and 48 with the spacer-mounting surface 46 and the spacer-abutting surface 49, respectively.

Optical Elements

Each optical element 22 may be embodied by any component acting on light in some fashion, for example to direct or change the direction of a light beam, focus or expand, collimate, filter, or otherwise transform or affect light. Examples of optical elements 22 include lenses of any type, such as for example, plano-convex, biconvex, plano-concave, biconcave, positive or negative meniscus lenses. Cemented doublet or triplet lenses of the types listed above can also be considered. Each optical element 22 may also be embodied by diffractive lenses, mirrors, diffractive optical elements (DOEs), pinholes, reticles, or the like. Each optical element 22 may have spherical or aspherical surfaces and may have an off-axis profile. Each optical element 22 may also have one or two planar surfaces. In other embodiments, each optical element 22 may be embodied by a more complex subassembly of optical components such as for example one or more lenses mounted in an inner sleeve, a mirror or a lens mounted in a spider, a lens or a lens barrel mounted in an optical mount which is itself mounted on an optical bench, etc. In other variants, each optical element 22 may be embodied by typical components of optical assemblies such as a prism, wave plate or camera. Other possibilities include optical fibers, detectors, corner cubes, light sources such as lasers, LEDs, LCDs, light bulbs, and the like, or a Micro-Opto-Electro-Mechanical System (MO-EMS) such as for example a Digital Light Processing (DLP) system.

Each optical element 22 may have a first surface S1 and a second surface S2 opposite the first surface S1. It will be noted that throughout the present description, the "first" surface denotes by convention the surface facing forward of the cavity, towards the seat 28 of the barrel 24, whereas the "second" surface extends on the opposite side. It will be understood that this convention is used for ease of reference only and is not meant to confer any particular ranking or preferred orientation or characteristics to either surface.

In the illustrated embodiment of FIG. 2, the two optical elements 22a and 22b are lenses, and will be sometimes referred to herein as the first lens 22a and the second lens 22b. It will be readily understood that this terminology is used as a shorthand only. In other variants different types of optical elements may be used.

By way of example, in the illustrated example of FIG. 2 the first lens 22a is a plano-convex lens, that is, its first surface S1 is planar and its second surface S2 is convex and has a constant radius of curvature. The second lens 22b is a biconvex lens, that is both its first and second surfaces S1 and S2 are convex and have a constant radius of curvature. It will however be readily understood that in various other embodiments, one or both surfaces of any one of the optical elements 22 may be curved, either convex or concave, partially or in their entirety, in a variety of possible combinations. As explained above, embodiments of the invention may be applied to optical elements having a more complex construction such as aspherical lenses, compound lenses or other types of lenses, mirrors, DOEs, pinholes, etc. It will further be understood that the designation of "first" and "second" as used here is not meant to impart a preferential ranking or preferred orientation or characteristics to the described components.

Barrel

The barrel 24 may be embodied by any structure in which optical elements may be mounted and centered. Typical barrels such as the one illustrated in FIG. 2 include a hollow cylindrical housing 30 having an inner wall 34, as mentioned above, and also an outer wall 36. It will be readily understood that the barrel 24 may have any shape, mechanical features or additional components adapted to engage, connect to or otherwise interact with other structures as required by the context in which the optical assembly 20 is to be used. For example, the outer wall 36 of the barrel 24 may be provided with threads, holes, pins, projections, flanges and the like without departing from the scope of the invention. Alternatively, the barrel 24 may be an integral part of a larger optical assembly, such as for example a camera objective or a microscope objective.

The cavity 32 may have any shape adapted to receive the optical elements 22 therein. Each optical element 22 can be considered properly aligned within the barrel 24 when the centers of curvature of all curved surfaces (S1, S2 or both) lie on the center axis B of the cavity, which be defined as its symmetry axis.

As mentioned above, the optical assembly 20 may include a seat 28 provided in the cavity 32. In the example of FIG. 2, the first surface S1 of the first lens 22 rests on the seat 28. In some embodiments, the seat 28 is defined by a shoulder 38 formed in the inner wall 34 which projects inwardly within the cavity 32. In some embodiments, the shoulder 38 may form a right angle with respect to the inner wall 34 of the barrel 24, such that the first surface S1 rests on the corner edge of the shoulder 38. Optionally, the corner edge can be rounded or bevelled by polishing or machining to avoid damaging the first surface S1 of the optical element 22. It will be readily understood that in other embodiments the contact between the first surface S1 and the seat 28 may be different. Furthermore, in some embodiments the seat 28 need not extend along the entire circumference of the inner wall 34 of the barrel but may include missing portions or other discontinuities, or may be embodied by a plurality of radially aligned projections spaced apart along the inner wall. In other implementations, the seat 28 may be embodied by a separate structure affixed to the barrel, such as for example a ring-shape component threaded to the barrel or otherwise affixed to the barrel.

Retaining Rings

As mentioned above, in the example of FIG. 2 the plurality of components mounted in the cavity includes a first and a second retaining rings 26a, 26b securing the first and second optical element 22a and 22b in the cavity.

Still referring to FIG. 2, the barrel 24 may be provided with a first set of barrel threads 42a. The first retaining ring 26a is affixed to the barrel 24 through a first set of ring threads 43a complementary to the first set of barrel threads 42a. Furthermore, the barrel 24 is provided with a second set of barrel threads 42b and the second retaining ring 26b is affixed to the barrel 24 through a second set of ring threads 43b complementary to the second set of barrel threads 42b. In the illustrated embodiment, the first and second sets of barrel threads 42a and 42b are defined as two different portions of a single set of threads extending along the entire inner wall 34 of the barrel 24. In other implementations, the first and second sets of barrel threads may differ, as known in the art.

The expression "threads" is meant to refer to engageable helicoidal projections on two components allowing one component to be screwed on or within the other. By convention, a single thread is generally considered to be the portion of a helicoidal projection corresponding to one screw turn, whereas the length of the projection defining the entire screw path is referred to as threading or a set of threads. As their names entail, the barrel threads are provided along a wall of the barrel whereas the ring threads are provided along a wall of the associated retaining ring. In the embodiments illustrated herein, the barrel threads are disposed along the inner wall 34 of the barrel 24 whereas the ring threads are along the outer perimeter of each retaining ring 26, such that the retaining ring can be screwed inside the cavity 32. Each set of threads can be defined by forward thread faces, facing inwardly of the cavity and towards the seat, and rearward thread faces, facing outwardly of the cavity and away from the seat. It will be readily understood that either set of threads 42a, 42b, 43a and 43b need not be continuous along the entire screw path, but may include missing segments or other discontinuities as long as sufficient contact points are provided to allow engagement of the complementary threads.

Figure 4A:
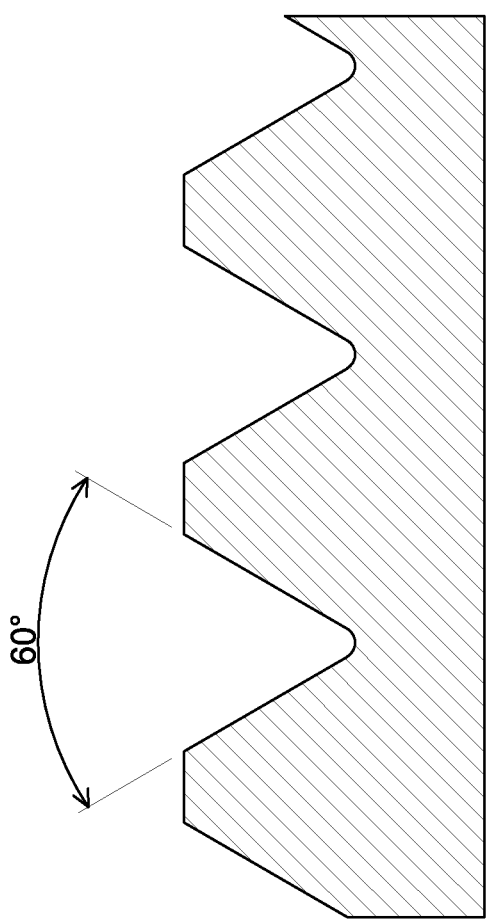
FIGS. 4A to 4D illustrate different types of thread shapes.
Figure 4B:
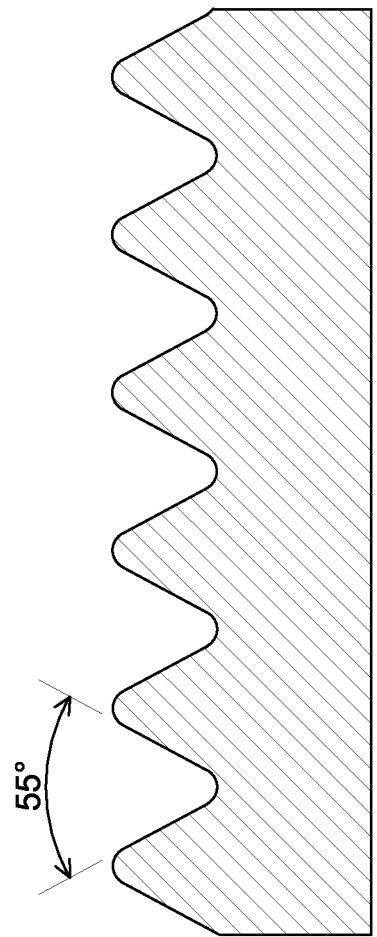
Figure 4C:
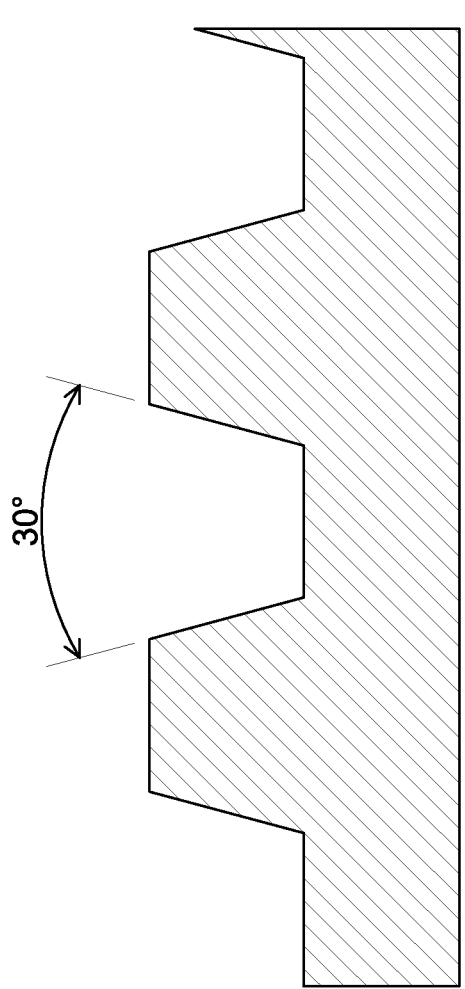
Figure 4D:
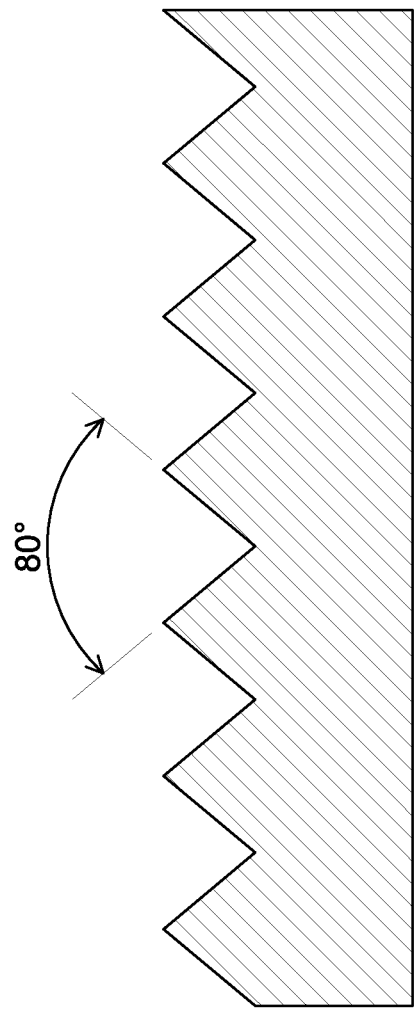

One skilled in the art will understand that complementary sets of barrel threads 42 and ring threads 43 have a common cross-sectional thread shape, thread angle and pitch. By definition, the thread angle is the angle formed by the opposite walls of a thread when viewed in cross-section, while the pitch of a thread set is the spacing between two consecutive crests in a set of threads. By «complementary», it is understood that the profiles of the barrel threads 42 and ring threads 43 are such that they can be screwed together, which usually involves a same pitch (within mechanical tolerances allowing their proper engagement and relative rotation). Although the barrel threads 42 and ring threads 43 are shown as having a same overall shape in the illustrated embodiments, in other variants they may have different shapes as long as the complementary condition as explained above is met. Referring to FIGS. 4A to 4D, various cross-sectional thread shapes are illustrated, by way of example. FIG. 4A shows a truncated triangular thread shape with a thread angle of 60°, which is representative of a common thread standard. The crest of each thread is shown as truncated, although in different embodiments the thread shape may define a regular triangle. In the example of FIG. 4B, the crests and grooves of the threads are shown as having a rounded shape, and the thread angle is shown as 55°. The thread shapes shown in FIGS. 4A and 4B are commonly used for mounting optical components. However, other thread shapes are also known in the art, such as a trapezoidal shape (FIG. 4C), or a regular triangular shape (FIG. 4D). In other variants, the thread shape may be non-symmetrical, that is, the opposite walls of a thread may be oriented at different angles with respect to a plane perpendicular to the center axis of the cavity. Of course, the shapes and thread angles shown herein are given by way of example only and should not be construed as exhaustive representations of possible thread profiles.

Resilient Spacer

With continued reference to FIGS. 2 and 2A to 2C, the resilient spacer 40 according to one variant is shown in isometric view. As mentioned above, the resilient spacer may have a generally cylindrical shape including a cylindrical wall 45 having a height h, and opposite forward and rearward rims 47 and 48. The height h may be selected in order to provide the desired spacing between the first and second optical elements 22a and 22b. In accordance with some implementations, the resilient spacer 40 is resiliently deformable to a compressed state in which its outer dimensions allows its insertion within the cavity 32, and a biased state, in which the cylindrical wall 45 of the resilient spacer has an expended diameter and contacts the inner wall 34 of the barrel 24. When in the compressed state, the resilient spacer 40 can therefore be slid into the cavity 32 until it reaches the desired position, for example abutting on the first retaining ring 26a. Once released from the compressed state, the spring constant of the resilient spacer 40 tends to bias the resilient spacer 40 outwardly, so that the outer surface of the cylindrical wall 45 presses against the inner wall 34 of the barrel 24, therefore eliminating any lateral play on the position of the resilient spacer 40.

In accordance with one implementation, the resilient spacer 40 may include a slit 41 machined through a portion of the cylindrical wall 36 along the full length h. The resilient spacer 40 is preferably made of a resilient material such as metals or plastics. Preferably, the material of the resilient spacer 40 has a spring constant allowing for the resilient spacer 40 to be compressed and resiliently return to the biased position with an outward radial force sufficient to remove the diametric clearance between the resilient spacer 40 and the inner wall 34 of the barrel 24.

It will be readily understood that the physical parameters of the resilient spacer 40 such as its constituting material or materials, dimensions, and overall profile may be selected to optimize its spring constant in view of the desired biased and compressed states. One skilled in the art will be able to find the suitable spring constant for a given implementation in view of the parameters of a particular optical assembly.

The resilient spacer 40 may additionally be designed so as to ensure a maximal circularity of the resilient spacer 40 in both biased and compressed states. As will be readily understood by one skilled in the art, manufacturing a complete spacer made up of a resilient material and subsequently removing a small section to create a slit typically results in a slight widening of the empty space between the two edges bordering the slit. In some implementations, the resilient spacer 40 preferably has an outer diameter prior to the slit being formed which is equal or very close to the diameter of the cavity 32. This may avoid the spacer taking an oval shape when in either the biased or the compressed state.

Positioning of Components in the Optical Assembly

As explained above, it is desirable in the art to ensure that optical elements in an optical assembly are precisely positioned with respect to each other so that they act on light in accordance with their intended optical function. In accordance with one aspect, the components of the optical assembly are designed and arranged so that each optical element is precisely centered with respect to the center axis B of the cavity, and positioned along the center axis B with a high degree of precision, such as for example 10 to 25 µm for a typical precision optical assembly.

Optical assemblies are typically made by sequentially inserting each component, that is, the optical elements, retaining rings, spacers, an the like, inside the cavity of the barrel from one end until they abut on the seat, on another feature of the barrel or on the previously inserted component. In some implementations, a given optical element may be aligned and fixed in position before the insertion of the next optical element.

In accordance with one aspect, there is provided a method of mounting a plurality of optical elements in a barrel.

As mentioned above, in the illustrated example of FIG. 2 the first lens 22a is secured between the seat 28 and the first retaining ring 26a. The centering of the first lens 22a within the cavity depends on several factors. One skilled in the art will understand that the centering error of the surface S1 of the first lens 22a according to the center axis B of the barrel 24 may depend on the concentricity of the seat 28 and/or on any manufacturing error in its perpendicularity relative to the center axis B. In some implementations, these manufacturing errors can be kept very low by using suitable manufacturing practices. For example, currently available techniques can provide centering errors typically less than about 5 µm.

Figure 3A:
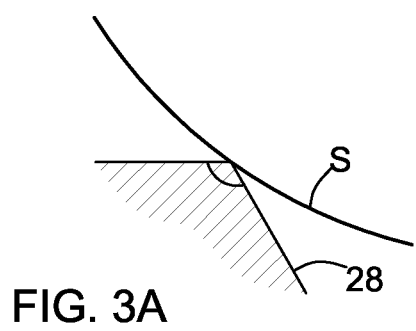
FIG. 3A to 3E are schematic representations of different types of engagements between a surface of an optical element and a seat.
Figure 3B:
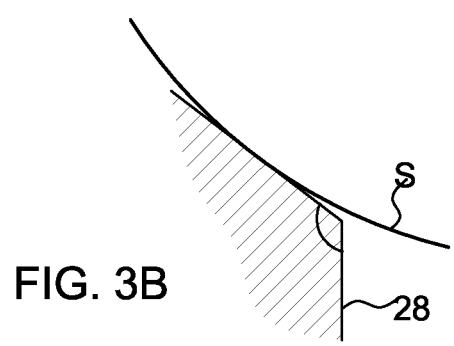
Figure 3C:
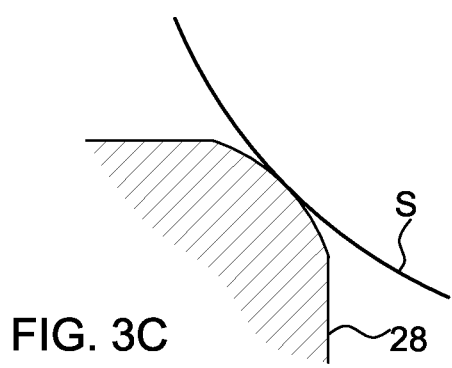
Figure 3D:
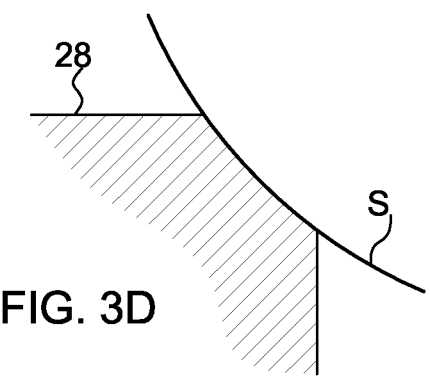
Figure 3E:
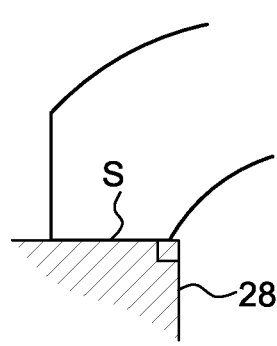

Referring to FIGS. 3A to 3E, different types of other possible engagement schemes between a surface S and a seat, which can for example embody the engagement of the first surface S1 of the first lens 22a with the seat 28 of the barrel of the present optical assembly, are schematically illustrated. FIG. 3A shows an edge contact, where the curved surface S rests on an edge of the seat 28. It can be noted that the edge need not define a right angle. FIG. 3B shows a tangential contact, where the curved surface S rests on a wall of the seat that is oriented along a tangent of the surface S at the contact point. In the variants of FIGS. 3C and 3D the seat 28 itself is curved along the contact point, with a curvature opposite to that of the surface S in FIG. 3C such that they are in toroidal contact, and with a curvature matching that of the surface S in the example of FIG. 3D to define a spherical contact. Finally, in some embodiments the surface S may be planar at least in the region where it abuts on the seat 28, enabling a planar contact such as shown in FIG. 3E.

The centering of the first lens 22a is also impacted by the force applied on this first lens 22a by the first retaining ring 26a, which in turn depends on the alignment of the retaining ring within the cavity. As known in the art, engageable sets of threads have a certain degree of play between them, to enable their relative movement. With respect to the first retaining ring 26a of the optical assembly 20 of FIG. 2, this play leads to a potential decentering of the first retaining ring 26a within the cavity 32, accompanied by a tilt of this retaining ring 26a. This decentering and tilt of the first retaining ring 26a are in turn transferred to the first lens 22a.

Figure 2A:
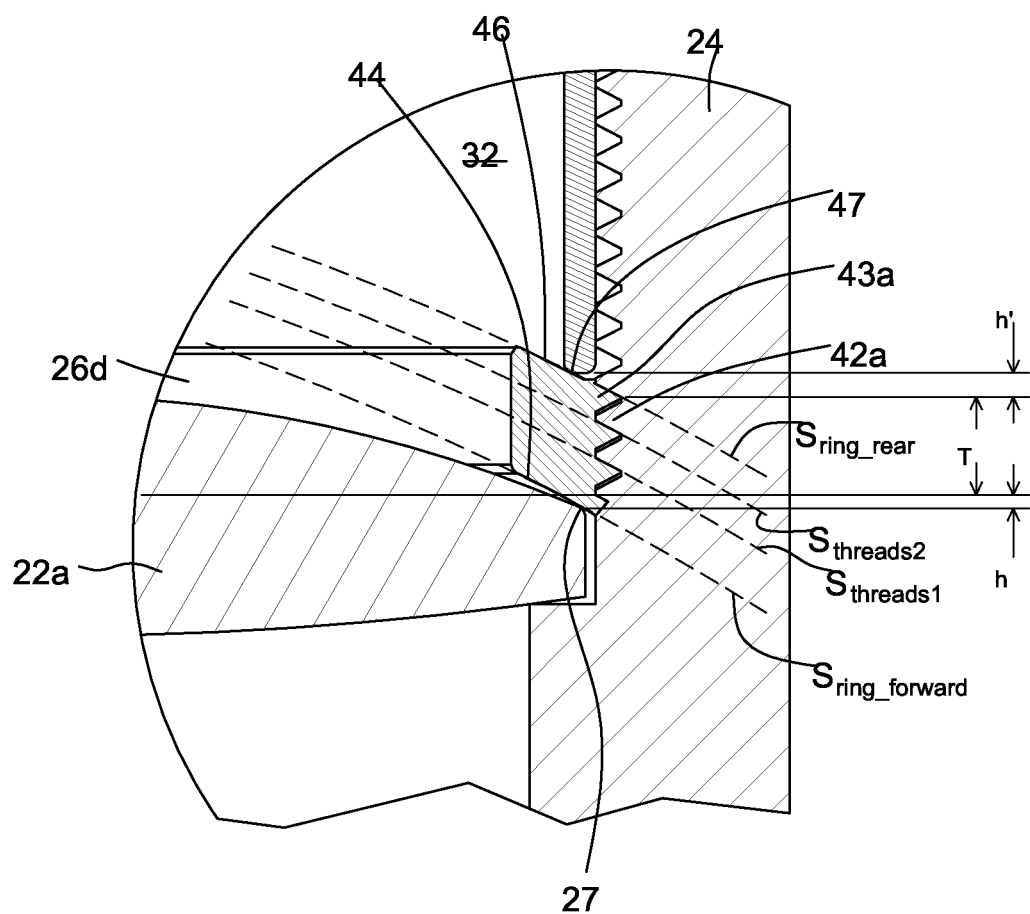
FIG. 2A is an enlarged view of portion A of FIG. 2.
Figure 2C:
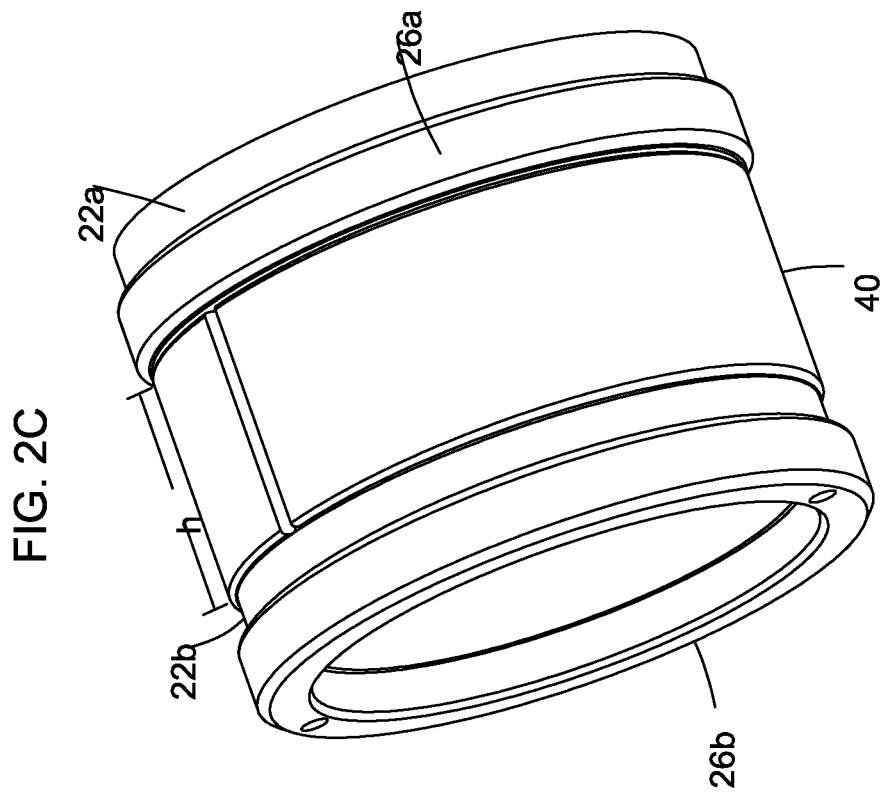
FIG. 2C is an isometric view of the components inside the optical assembly of FIG. 2.
Figure 2B:
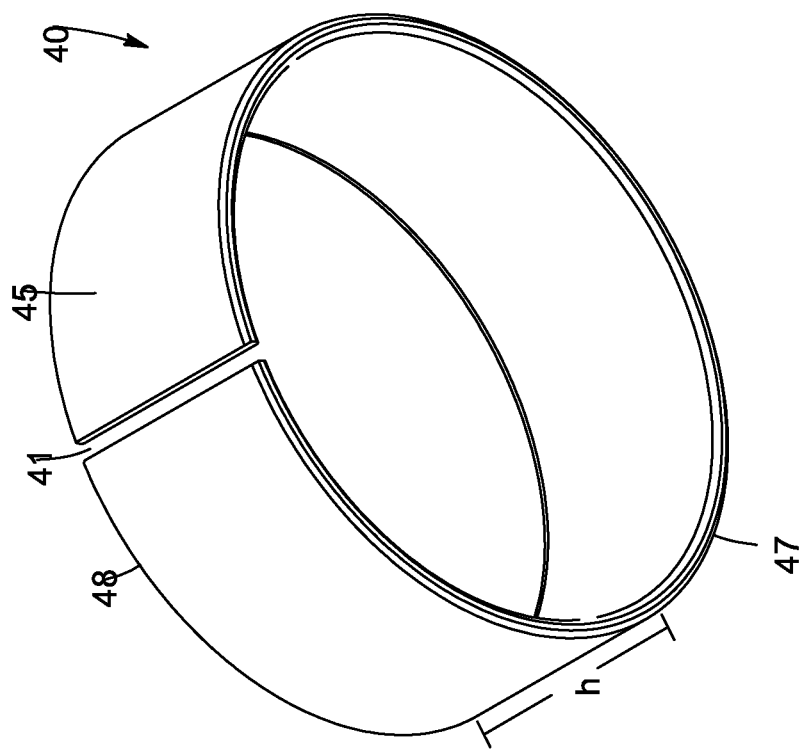
FIG. 2B is an isometric view of the resilient spacer of FIG. 2.

With reference to FIG. 2A, in one implementation, the first retaining ring 26a has a lens-abutment surface 44 engaging a peripheral mounting edge 27 of the first lens 22a.

As will be readily understood by one skilled in the art, the one-dimensional nature of the peripheral mounting edge 27 results in a circular edge-contact line between the first retaining ring 26a and the first lens 22a. This engagement is also described here as "edge mounting" or "edge contact mounting". Preferably, the lens-abutment surface 44 of the first retaining ring 26a has a frustro-spherical profile, that is, it defines a circular arc segment having a symmetry of revolution about the center axis of the retaining ring (which coincides with the center axis B of the cavity). The radius of curvature of the lens-abutment surface 44 is selected in view of the thread angle of the first set of ring threads 43a to maintain a centering of this edge contact line if the first retaining ring 26a is decentered in the cavity. It can be demonstrated that the lateral movement of the first retaining ring 26a within the cavity 32 as this retaining ring 26a is screwed in against the first lens 22a is constrained along the surface of imaginary spheres $S_{threads}1, S_{threads}2, \ldots$ having their center C approximatively positioned at a common point on the center axis B of the cavity 32. These spherical surfaces $S_{threads}$ describe the trajectory of the line of contact between the forward faces of the barrel thread 42a with the rearward faces of the ring thread 43a.

In one embodiment, the lens-abutment surface 44 of the first retaining ring 26a has a frustro-spherical profile having a radius of curvature Ring defining a sphere $S_{ring\_forward}$ concentric with the spheres $S_{threads}$ describing the movement of the first retaining ring 26a within the threads 42a of the barrel 24. As a consequence, the edge contact line defined by the intersection of the lens-abutment surface 44 with the peripheral mounting edge 27 remains at a same position regardless of the decentering of the first retaining ring 26a within the cavity 32. The peripheral mounting edge 27, and therefore the first optical element 22a itself, is therefore always centered by the first retaining ring 26a, regardless of whether or not the first retaining ring 26a is centered.

It can be demonstrated that the above condition may be met if the radius of curvature $R_{ring\_forward}$ of the lens-abutment surface 44 meet the following equation:

$$R_{Ring\_forward} = \sqrt{\left[\frac{d_{ring}}{2\tan(\varphi_{threads}/2)} - h_{edge\_m} - T_{edge\_m}/2\right]^2 + Y_{pme}^2} \quad (1)$$

Where:
$R_{ring\_forward}$ is the radius of curvature of the lens abutment surface of the first retaining ring;
$d_{ring}$ is the diameter of the first retaining ring along the first set of ring threads;
$\varphi_{thread}$ is the value of the thread angle of the first set of ring threads;
$Y_{pme}$ is a half-diameter of the peripheral mounting edge;
$h_{edge\_m}$ is the distance between (i) a first point of contact of the first set of barrel threads with the first set of ring threads proximate to the first optical element and (ii) the edge contact line; and
$T_{edge\_m}$ is the distance between (i) the first point of contact of the first set of barrel threads with the first set of ring threads proximate to the first optical element and (ii) a last point of contact of the first set of barrel threads with the first set of ring threads farthest from the first optical element diametrically opposite to the first point of contact.

Figure 5:
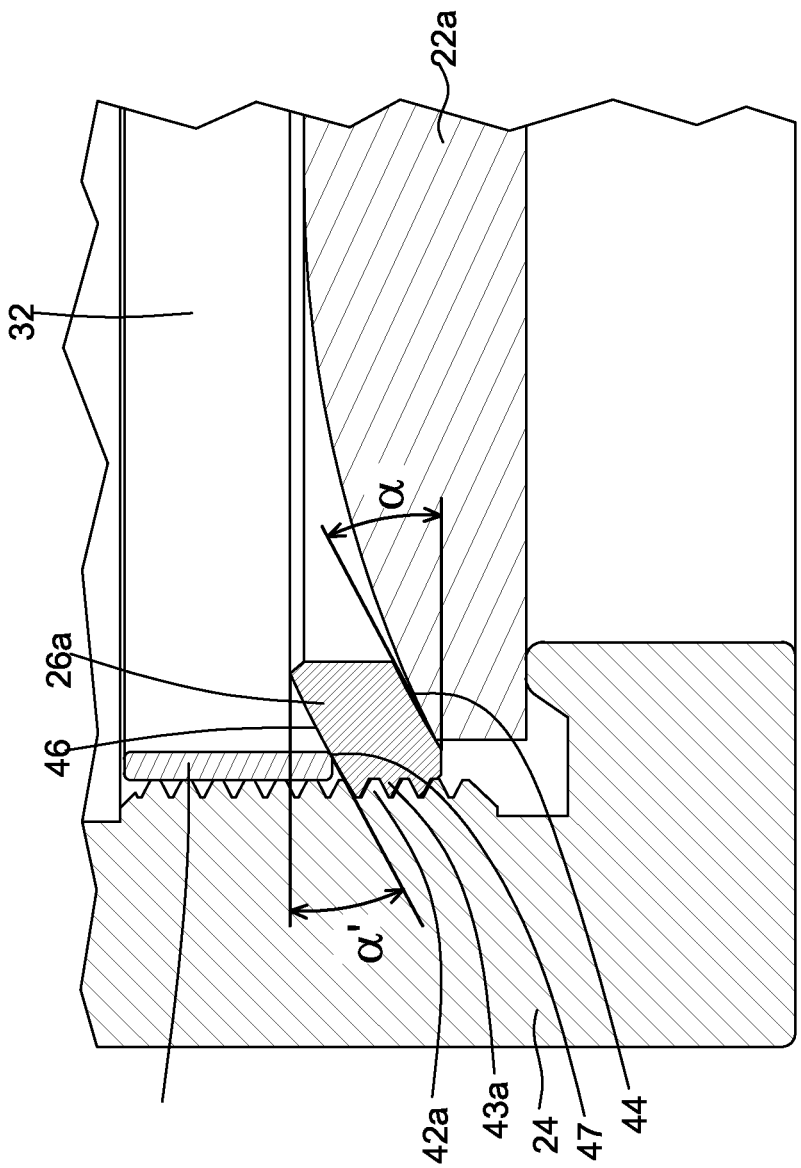
FIG. 5 is a schematic cross-section view of an optical assembly including a frustro-conical spacer-mounting surface.

With reference to FIG. 5, in some implementations, the play between the first retaining ring 26a and the barrel 24 may be small enough that the centering of the edge contact line can be substantially maintained with a lens-abutment surface 44 having a frustro-conical profile, that is, it defines an inclined linear segment having a symmetry of revolution about the center axis of the first retaining ring 26a. The inclination angle α of the lens-abutment surface 44 with respect to a transversal plane of the cavity (a plane perpendicular to the center axis B) is selected in view of the thread angle of the first set of ring threads 43a to maintain a centering of the edge contact line if the first retaining ring 26a is decentered in the cavity. It can be demonstrated that this condition is met if:

$$\alpha = \sin^{-1}\left(\frac{Y_{pme}}{R_{Ring\_forward}}\right) \quad (2)$$

where:
α is the inclination angle of the lens abutment surface with respect to the transversal plane of the cavity;
$Y_{pme}$ is the half-diameter of the peripheral mounting edge; and
$R_{Ring}$ is the radius of curvature of the equivalent frustro-spherical profile of the first retaining ring which defines a sphere Sting concentric with the imaginary spheres $S_{ring\_forward}$ describing the movement of the first retaining ring as explained above. $R_{Ring}$ is therefore given by equation (1) above and depends on the diameter of the first retaining ring along the ring threads $d_{ring}$, the value of the thread angle $\varphi_{thread}$, the half-diameter of the peripheral mounting edge Y, and the distances $h_{edge\_m}$ and $T_{edge\_m}$.

More details on edge contact mounting can be found in United States patent application published under number U.S. 2020/0264402A1 on Aug. 20, 2020, the entire contents of which being incorporated herein by reference.

In accordance with one aspect, one of the surfaces in contact with the resilient spacer, that is, either the spacer-mounting surface of the forward component or the spacer-abutting surface of the rearward component, is precisely aligned with respect to the center axis B of the cavity. Preferably, the other one of these surfaces is free to move during the mounting of the components in the barrel such that the precise alignment of the spacer-mounting or spacer-abutting surfaces is imposed on the other, and to other components of the assembly.

In the illustrated embodiment of FIG. 2a, a precise alignment of the spacer-mounting surface 46 of the first retaining ring 26a is achieved by using the same edge-mounting principle as described above for the engagement of the first retaining ring 26a and the first optical component 22a. The frontward rim 47 of the resilient spacer 40 is therefore shaped as or includes a frontward rim edge engaging the spacer-mounting surface 46 of the first retaining ring 26a along a circular edge contact line. In this variant, the spacer-mounting surface 46 has a frustro-spherical profile having a radius of curvature defining a sphere $S_{ring\_rear}$ concentric with the spheres $S_{threads}$. In this embodiment, the first retaining ring 26a therefore has opposite forward and rearward faces having frustro-spherical profiles sharing a same center of curvature. In this manner, the spacer-mounting surface 46 will always be centered within the cavity 32 of the barrel 24, regardless of the centering and tilt of the first retaining ring 26a. The frustro-spherical profile of the spacer-mounting surface 46 has a radius of curvature $R_{Ring\_rear}$ given by the formula:
where:

$$R_{Ring\_rear} = \sqrt{\left[\frac{d_{ring}}{2\tan(\varphi_{threads}/2)} + h' + T/2\right]^2 + Y_{f\_rim}^2} \quad (3)$$

$d_{ring}$ is a diameter of the first retaining ring 26a along the ring threads 43a;

$\varphi_{thread}$ is a value of a thread angle of the ring threads 43a;

$Y_{f\_rim}$ is a half-diameter of the frontward rim edge 47;

h' is a distance between (i) a first point of contact of the barrel threads 42a with the ring threads 43a proximate to the resilient spacer 40 and (ii) the edge contact line; and T is a distance between (i) the first point of contact of the barrel threads 42a with the ring threads 43a proximate to the resilient spacer 40 and (ii) a last point of contact of the barrel threads 42a with the ring threads 43a farthest from the resilient spacer 40 diametrically opposite to the first point of contact.

Referring again to FIG. 5, in some implementations where the play between the first retaining ring 26a and the barrel 24 is small as explained above, enough that the centering of the edge contact line can be substantially maintained with a spacer-mounting surface 46 having a frustro-conical profile, that is, it defines an inclined linear segment having a symmetry of revolution about the center axis of the first retaining ring 26a. In this variant, the spacer-mounting surface 46 of the first retaining ring 26a has a frustro-conical profile having an inclination angle α' with respect to a plane perpendicular to the center axis of the cavity 32 given by the formula:

$$\alpha' = \sin^{-1}\left(\frac{Y_{f\_rim}}{\sqrt{\left[\frac{d_{ring}}{2\tan(\varphi_{threads}/2)} + h' + T/2\right]^2 + Y_{f\_rim}^2}}\right) \quad (4)$$

where:

$Y_{f\_rim}$ is a half-diameter of the frontward rim edge 47;

$d_{ring}$ is a diameter of the first retaining ring 26a along the ring threads 43a;

$\varphi_{thread}$ is a value of a thread angle of the ring threads 43a;

h' (see FIG. 2A) is a distance between (i) a first point of contact of the barrel threads 42a with the ring threads 43a proximate to the resilient spacer 40 and (ii) the edge contact line; and T (see FIG. 2A) is a distance between (i) the first point of contact of the barrel threads 42a with the ring threads 43a proximate to the resilient spacer 40 and (ii) a last point of contact of the barrel threads 42a with the ring threads 43a farthest from the resilient spacer 40 diametrically opposite to the first point of contact.

Figure 6:
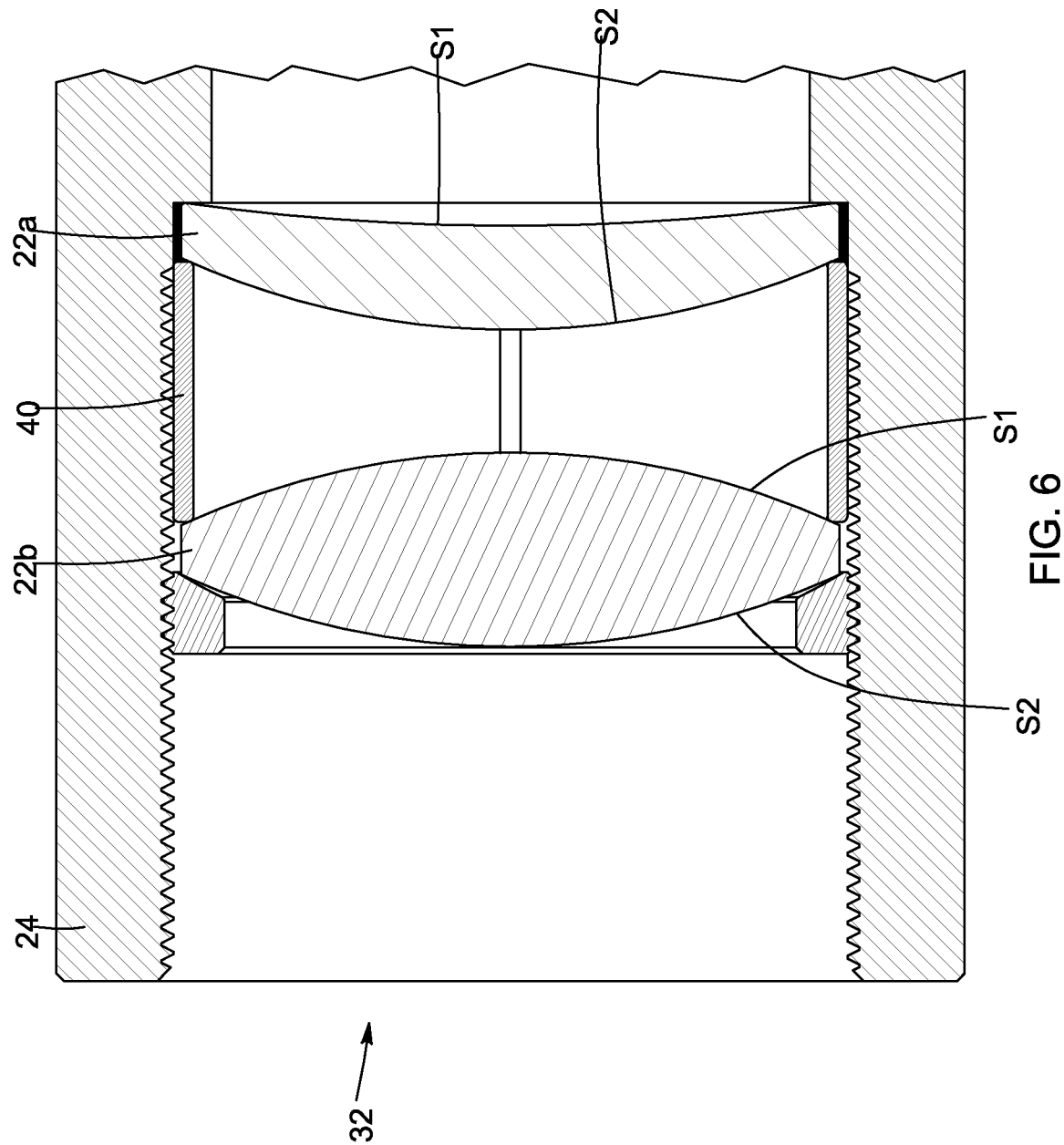
FIG. 6 is a schematic cross-sectional side view of an optical assembly according to another embodiment.

It will be readily understood by one skilled in the art that other configurations may be used to ensure that the resilient spacer 40 is centered through contact with a surface which is itself precisely aligned with respect to the center axis B of the cavity. Referring to FIG. 6, in some embodiments the plurality of components may successively include a first optical element 22a which defines the forward component. In this example, it is the surface S2 of the first optical element 22a which embodies the spacer-mounting surface. In this variant the spacer-mounting may be precisely centered within the cavity by mounting the first optical element 22a in the cavity using traditional alignment technique and fixing it in place using an adhesive instead of a retaining ring. The plurality of component is this variant also includes a second optical element, defining the rearward component, and a retaining ring. The first optical element is therefore secured between the resilient spacer and a seat provided in said cavity, and the second optical element is secured between the retaining ring and the resilient spacer.

Referring back to FIG. 2, once the first optical elements 22a and, if present, the first retaining ring 26a are positioned inside the barrel, the resilient spacer 40 is inserted into the cavity. As mentioned above, the resilient spacer can be compressed to occupy a smaller diameter than the cavity so that it can be inserted therein until the frontward rim 47 of the spacer 40 abuts on the spacer-mounting surface 46. The resilient spacer 40 can than be released from its compressed state so that it expands to its biased state, and press on the inner wall of the barrel, as explained above. The second optical elements 22b can then in turn be inserted into the cavity until its first surface S1, defining the spacer-abutting surface 49 abuts on the rearward rim 48 of the resilient spacer 40, and secured in place by the second retaining ring 26b which is screwed in place until it securely holds the second optical elements 22b against the resilient spacer 40.

In accordance with one aspect, and as mentioned above, an outwardly-directed resulting force is applied to the resilient spacer 40 by the engagements of the frontward and rearward rims 47 and 48 with the spacer-mounting surface 46 and the spacer-abutting surface 49, respectively.

Figure 7:
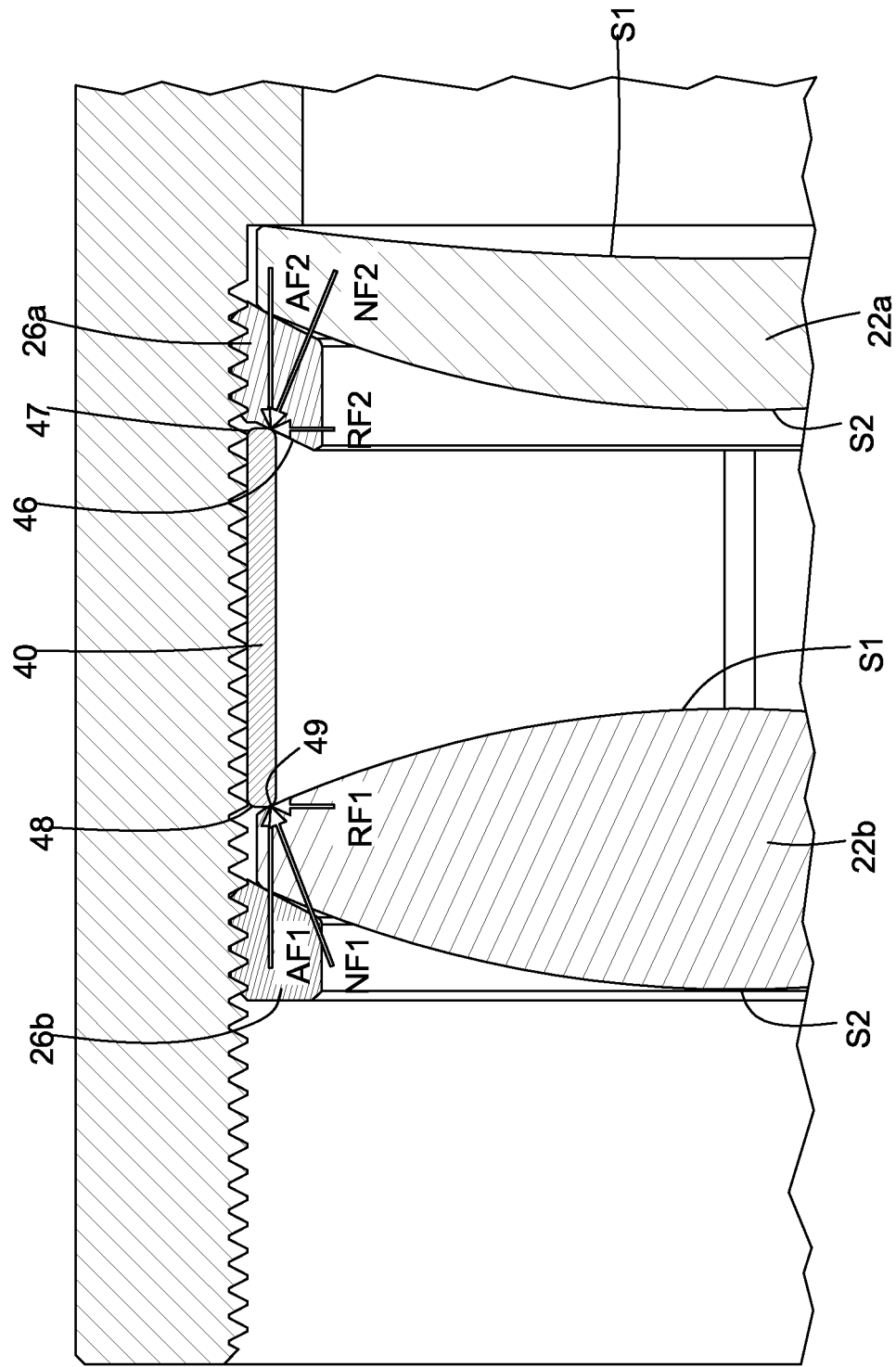
FIGS. 7 and 8 are diagrams showing force vectors resulting in an outward force being applied on the resilient spacer according to some implementations.

Referring to FIG. 7, vectors representing the forces applied on the resilient spacer are schematically illustrated. In this example, the first optical element 22a is a positive meniscus lens secures by edge-mounting using a first retaining ring 26a, and the second optical element 22b is a biconvex lens secure by a second retaining ring 26b. As the second retaining ring 26b is tightened against the second optical element 22b, a net force NF1 normal to a plane tangential to the each point of contact between (a) the first surface S1 of the second optical element 22b and (b) the rearward rim 48 of the resilient spacer 40 is applied to the resilient spacer 40. This net force NF1 includes an axial component AF1 parallel to the center axis B of the cavity, and a radial component RF1 extending in a plane perpendicular to the center axis B. A net force NF2 is applied on the resilient spacer 40 by the first retaining ring 26a and extends normal to a plane tangential to the each point of contact between (a) the spacer mounting-surface 46 and (b) the frontward rim 47 of the resilient spacer 40.

The axial force AF1 applied on the rearward rim 48 of the resilient spacer 40 has an amplitude dependent on the tightening of the second retaining ring 26b and other factors, and is directed frontward in the cavity. The axial force AF2 applied on the frontward rim 47 of the resilient spacer 40 is a reaction force equal in amplitude and opposite in direction to AF1, as will be readily understood by one skilled in the art. The radial forces RF1 and RF2 depend on the spatial profiles of the surfaces contacting the opposite rims of the resilient spacer, that is the spacer-abutting surface 49 (here embodied by the first surface S1 of the second optical element 22b) and the spacer-mounting surface 46. To ensure the precision positioning of the resilient spacer 40, the vector sum of RF1 and RF2 should be directed outwardly of the barrel, that is, towards the inner wall of the barrel. Preferably, at least one of these surfaces is convex. In other words, the radius the mounting surfaces curves away from the resilient spacer. In variants where both mounting surfaces are convex, the resulting radial force applied on the spacer will be outward and act to open the spacer towards its biased state. If only one of the mounting surfaces is convex, then the amplitude of the associated radial force RF1 or RF2 is preferably enough so that the vector sum of RF1 and RF2 still points outwardly of the cavity.

Figure 8:
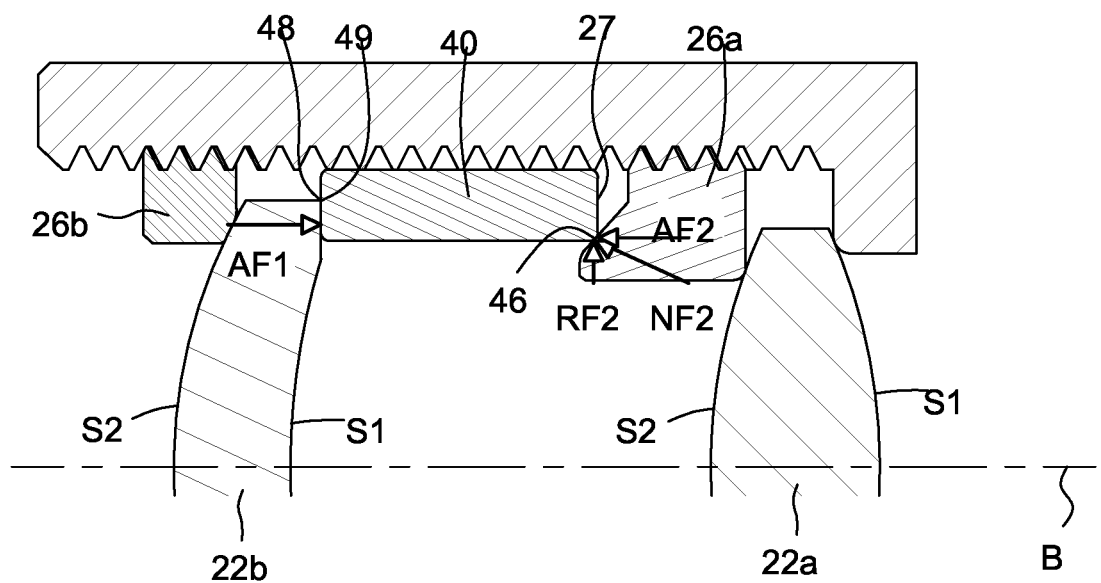
Figure 9A:
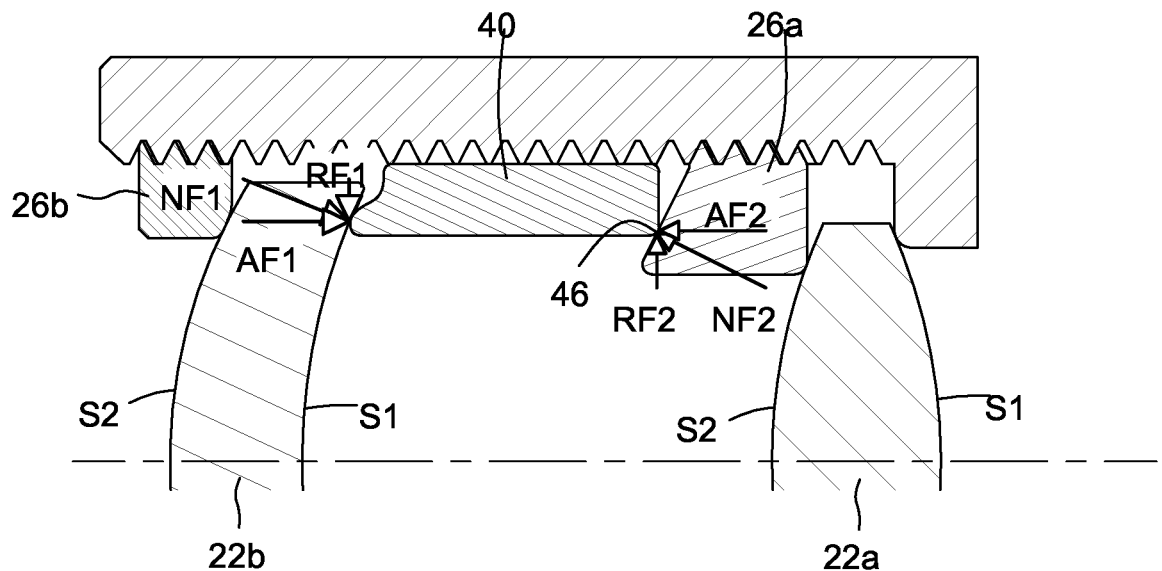
FIGS. 9A and 9B are diagrams respectively illustrating force vectors resulting in an outward force being applied on the resilient spacer according to one implementation, and force vectors which do not result in the desired outward force.

Still referring to FIG. 7 and with additional reference to FIGS. 8 and 9A, various configurations resulting on the above condition on the resulting radial force applied to the resilient spacer are schematically illustrated. By convention, the arrows illustrating the force vectors at play have a length representative of the amplitude of the represented force component.

In the variant of FIG. 7, the spacer-mounting surface 46 on the first retaining ring 26a has a convex frustro-spherical profile, similarly to the embodiment of FIG. 2. The first surface S1 of the second optical element 22b, defining the spacer-abutting surface 49, has a convex spherical profile determined by the optical function of this second optical element. Both the radial forces R1 and R2 therefore point outwardly, of course resulting in an outward resulting force being applied to the resilient spacer 40. It is of interest to note that in this illustrated example RF1 and RF2 are shown as having a similar amplitude, but that their amplitudes may differ in other variants.

Referring to FIG. 8, there is shown another variant of an optical assembly, illustrating other possible shapes and combinations of the spacer mounting surfaces. In this variant the second optical element 22b has a concave first surface S1, surrounded by a peripheral flange defining a spacer-abutting surface 49 perpendicular to the center axis B of the cavity, the rearward rim 48 of the resilient spacer also having a flat profile perpendicular to the center axis B of the cavity. In this case, the force applied by the tightening of the second retaining ring 26b is purely axial, and has no radial component. However, the spacer-mounting surface 46 of the first retaining ring 26a has a convex frustro-spherical profile, leading to an outward radial force RF2. The vector sum of RF1 (which is null) and RF2 therefore points outwardly of the cavity.

Figure 9B:
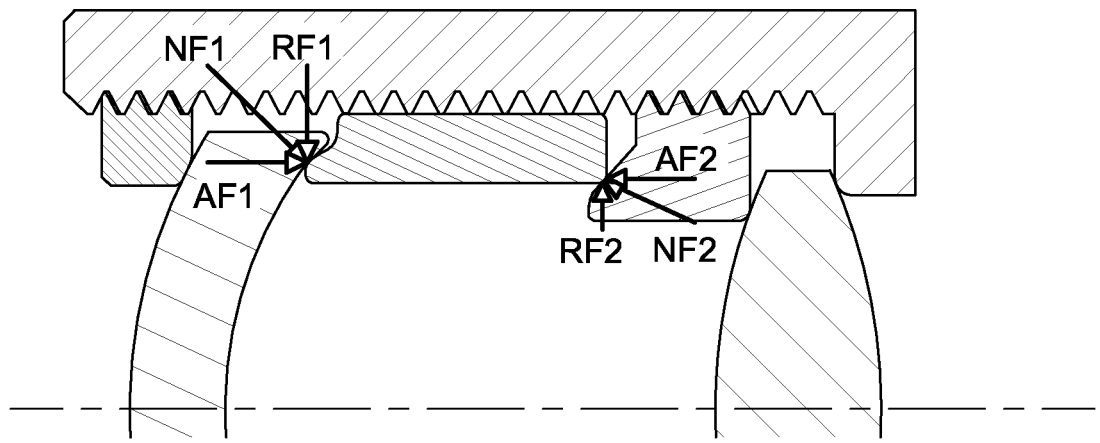

Referring to FIG. 9A, there is shown another variant, in which the first surface S1 of the second optical element 22b has a concave shape. The associated radial force RF1 is therefore directed inwardly, away from the wall of the cavity. The spacer-mounting surface 46 of the first retaining ring 26a however has a convex shape and a radius of curvature leading to an outward radial force component RF2 which has an amplitude greater than the radial force RF1. The vector sum of RF1 and RF2 therefore points outwardly of the cavity. This is to be contrasted to the configuration shown in FIG. 9B, in which the radial force RF1 is greater than the radial force RF2. In that particular case, the resulting radial force would point inwardly of the cavity.

It will be readily understood that additional features may be provided to the assemblies described above without departing from the scope of the invention. In one example, the rotation of one or more of the optical elements may be blocked, to fix and preserve the clocking angle of this or these optical elements. This may for example be achieved by providing a pair of channels longitudinally through the optical element at opposite locations along the periphery of the optical element, and inserting locking pins in the channels. Corresponding locking grooves may be provided in the component on which the optical element abuts, for example the seat or the spacer, to engage the pin when the optical element has the desired clocking angle.

Figure 1B:
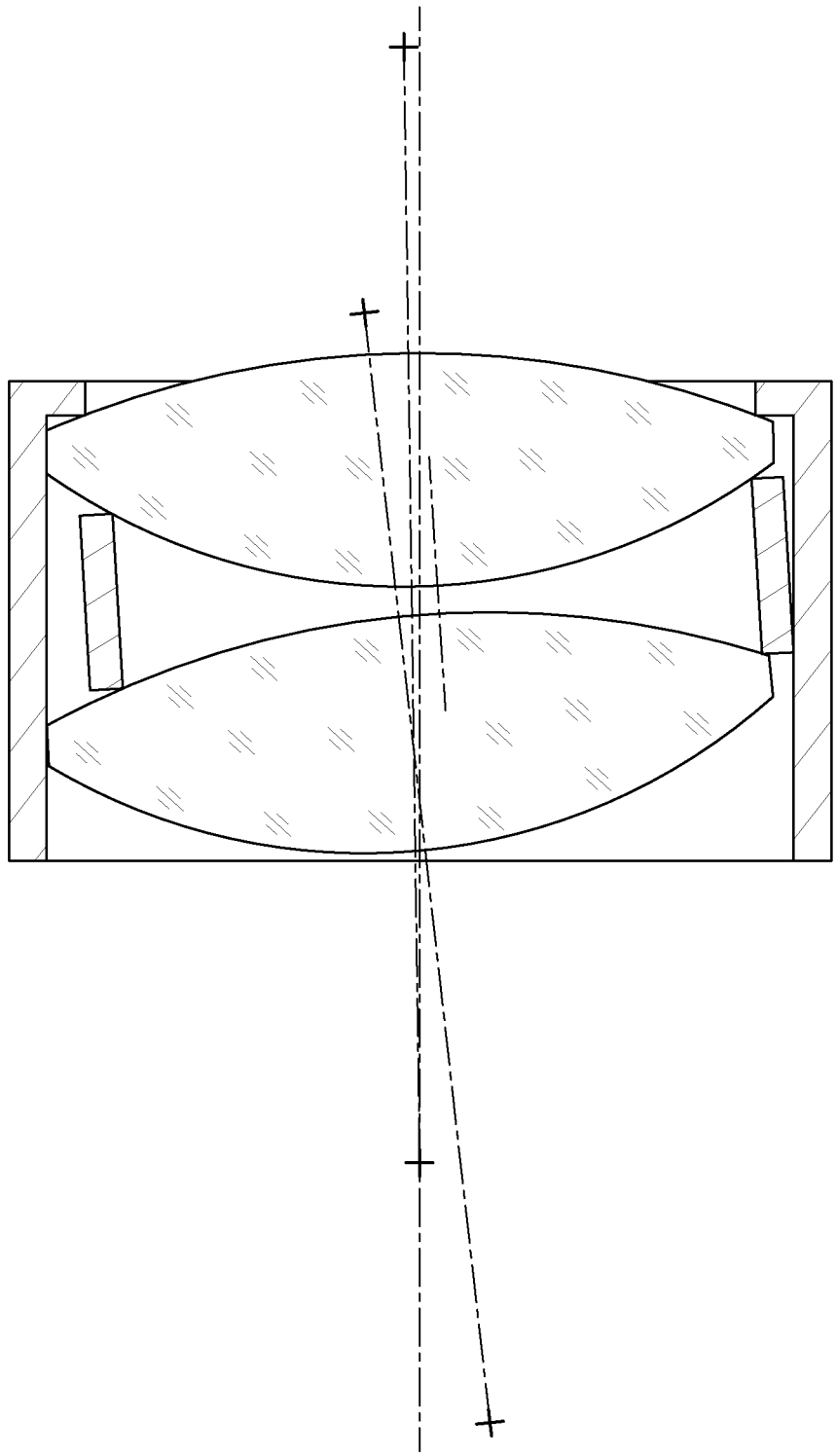

The configuration of FIG. 2 was tested using two different resilient spacers provided with a slit as explained above. Over the course of 16 measurements, the average obtained centering precision was of 5.99 µm, with a standard deviation of 2.65 µm. The decentering @2σ was of 11.28 µm, which corresponds to a significant improvement compared to classical spacers where several parameters may impact the centering of the second lens as depicted on FIG. 1B.

Figure 10:
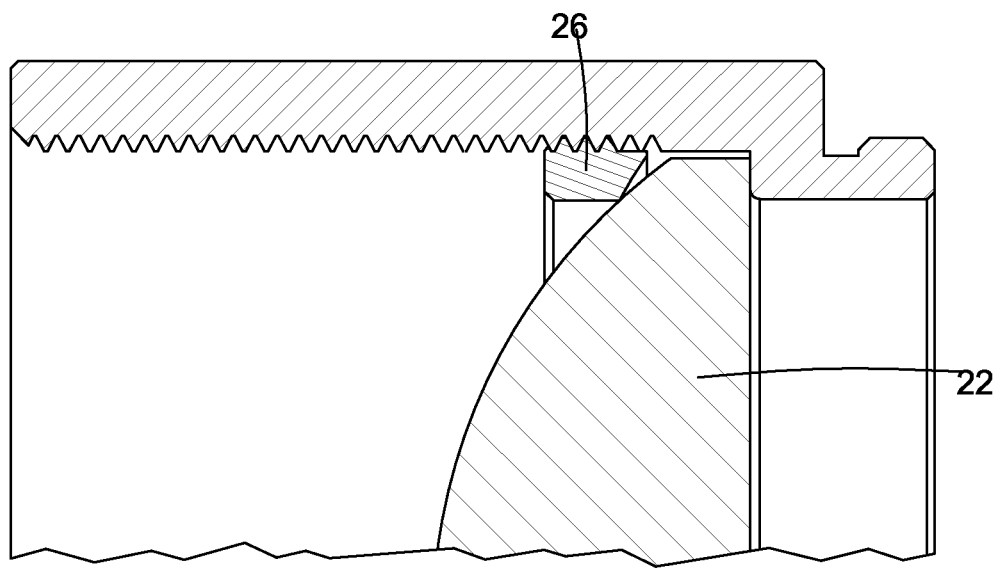
FIG. 10 illustrates and optical assembly where edge mounting of an optical element with a retaining ring is not physically possible.

As mentioned above, edge contact mounting as described in US 202010264402A1 can be helpful for the precision centering of optical elements in a barrel. Typically, this technique involves adjusting the profile of the retaining ring to define a frustro-spherical profile abutment surface engaging the peripheral edge of the optical element, this frustro-spherical profile having a radius of curvature selected in view of the thread angle. It is to be noted that in some instances, the radius of curvature of a frustro-spherical abutment surface (or the inclination angle of a frustro-conical abutment surface) may by large enough to lead to a situation where the edge mounting approach would not be physically possible, as the second surface of the optical element would block the trajectory of the retaining ring. This is illustrated in FIG. 10. In such cases, changing the parameters of the retaining ring and cavity, for example increasing the thread angle, can allow the edge-contact mounting to be performed. In other variants, for example if the use of a standard thread angle is desired or required, this issue may be circumvented using a resilient spacer as described herein.

Figure 11A:
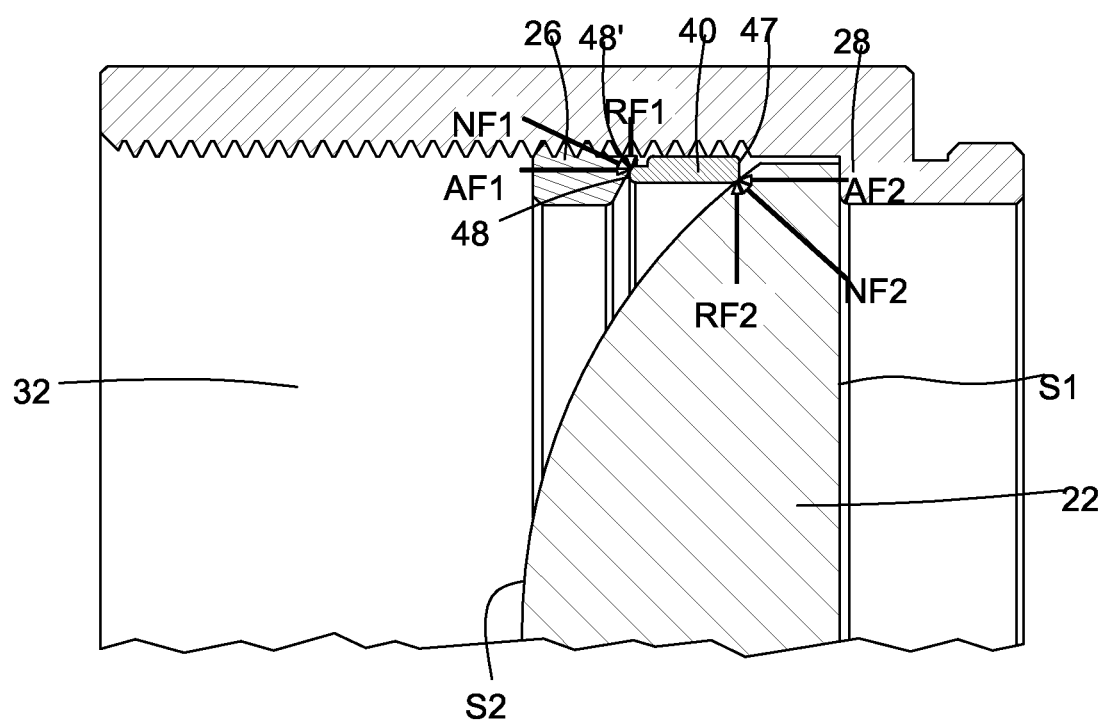
FIG. 11A is an enlarged view of portion of FIG. 11.

Referring to FIGS. 11 and 11A, there is shown an optical assembly 20 where the plurality of components includes, successively, an optical element 22 defining the forward component, and a retaining ring 26 defining the rearward component. The optical element 22 is secured between the resilient spacer 40 and a seat 28 provided in the cavity 32. The rearward rim 48 of the resilient spacer 40 includes a rearward rim edge 48' engaging the spacer-abutting surface of the retaining ring along a circular edge contact line precisely centered within the cavity. In this case, it is therefore the spacer-abutting surface of the rearward component (the retaining ring) which is precisely centered, and constrains the resilient spacer and the optical element to adopt the same centered alignment.

In some variants, the spacer-abutting surface of the retaining ring has a frustro-spherical profile having a radius of curvature $R_{Ring\_forward}$ given by the formula:

$$R_{Ring\_forward} = \sqrt{\left[\frac{d_{ring}}{2\tan(\varphi_{threads}/2)} - h - T/2\right]^2 + Y_{r\_rim}^2} \quad (5)$$

where:
$d_{ring}$ is a diameter of the retaining ring along the ring threads;
$\varphi_{thread}$ is a value of a thread angle of the ring threads;
$Y_{r\_rim}$ is a half-diameter of the rearward rim edge;
h is a distance between (i) a first point of contact of the barrel threads with the ring threads proximate to the resilient spacer and (ii) the edge contact line; and
T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

In other variants, the spacer-abutting surface of the retaining ring has a frustro-conical profile having an inclination angle α with respect to a plane perpendicular to the center axis of the cavity given by the formula:

$$\alpha = \sin^{-1}\left(\frac{Y_{r\_rim}}{\sqrt{\left[\frac{d_{ring}}{2\tan(\varphi_{threads}/2)} - h - T/2\right]^2 + Y_{r\_rim}^2}}\right) \quad (6)$$

where:

$Y_{r\_rim}$ is a half-diameter of the rearward rim edge;

$d_{ring}$ is a diameter of the retaining ring along the ring threads;

$\varphi_{thread}$ is a value of a thread angle of the ring threads;

h is a distance between (i) a first point of contact of the barrel threads with the ring threads proximate to the resilient spacer and (ii) the edge contact line; and T is a distance between (i) the first point of contact of the barrel threads with the ring threads proximate to the resilient spacer and (ii) a last point of contact of the barrel threads with the ring threads farthest from the resilient spacer diametrically opposite to the first point of contact.

It will be noted that in this implementation, the spacer 40 does not necessarily provides space between two optical elements, but has a main function of allowing edge contact mounting of the optical element 22. Furthermore, the engagement of the frontward and rearward rims 47 and 48 of the spacer 40 with the abutment surface 46' of the retaining ring 26 and the second surface S2 of the optical element apply an outward resulting force to the resilient spacer 40. By way of example, in the illustrated embodiment of FIG. 11A, as the spacer-abutting surface 46' is concave, the radius of curvature of the second surface S2 of the optical element is preferably convex and greater than the radius of curvature of the spacer-abutting surface 46' of the retaining ring. Advantageously, this approach will therefore be useful in all cases where classical edge-mounting would be impossible because the radius of curvature of the second surface S2 of the optical element is too small.

It is also of note that the equations provided herein with respect to suitable frustro-spherical and frustro-conical profiles for use in the context of the illustrated assemblies are preferred embodiments only and are not meant as limitative to the scope of protection. In realizing the described embodiments, the level of precision to which a particular radius od curvature or inclination angle profile may fit the provided equations is understood to be commensurate with the desired degree of precision of the alignment of the components of the optical assembly. Also, one skilled in the art will understand that the sign convention used in the equations above implies that the parameter h or h' is positive. In other variants where the distance h or h' would overlap the distance T, the sign of h or h' would however be negative.

Kits of Components

In some implementations, some of the components used in assemblies such as described above or the like may be provided in the form of a kit.

Figure 12A:
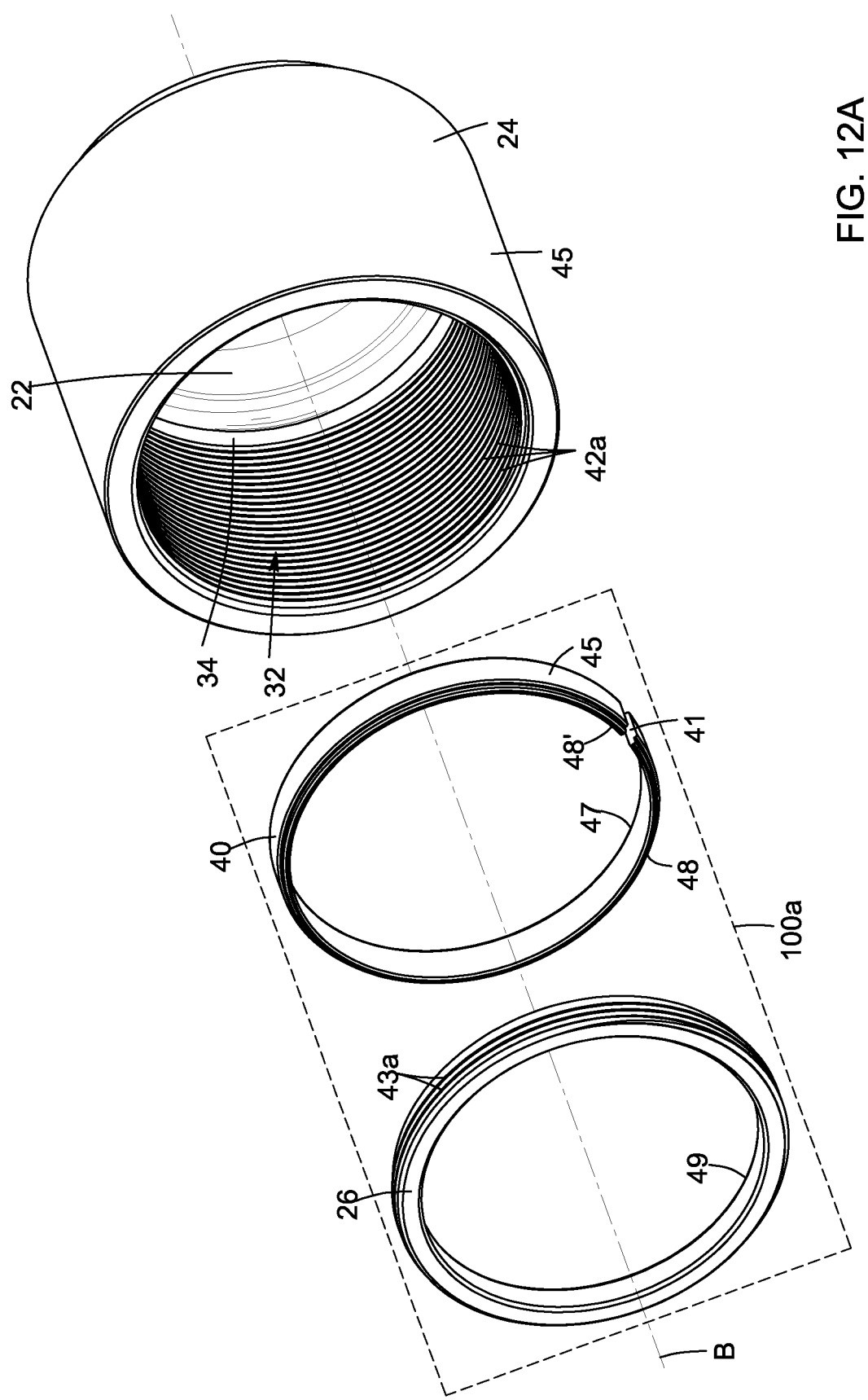
FIGS. 12A and 12B illustrate components of kits according to some variants.

With reference to FIG. 12A, in one example a kit 100a for precisely centering an optical element 22 such as a lens mounted in a barrel 24 having an inner wall 34 and including a cavity 32 having a center axis B, the barrel 24 being provided with a set of barrel threads 42a, is shown. It will be readily understood that such a kit may be used to make an assembly such as shown in FIGS. 11 and 11A.

The kit 100a includes a resilient spacer 40 and a retaining ring 26.

The resilient spacer 40 has a cylindrical wall 45 and opposite frontward and rearward rims 47 and 48. The frontward rim 47 is engageable with a spacer-mounting surface 46 at a rearward periphery of the optical element 22, and the rearward rim 48 has a rearward rim edge 48'. As with the embodiments described above, the resilient spacer 40 is resiliently deformable between a compressed state allowing its insertion within the cavity 32, and a biased state in which the cylindrical wall 45 of the resilient spacer contacts the inner wall 34 of the barrel 24. By way of example, the spacer may have a slit 41 extending through a portion of the cylindrical wall 45 along its length.

The retaining ring 26 has a set of ring threads 43a complementary to the barrel threads 42a. The retaining ring 26 further has a forward periphery comprising a spacer-abutting surface 49 engageable with the rearward rim edge 48' of the rearward rim 48 of the resilient spacer 48 along a circular edge contact line precisely centered within the cavity 32 when the retaining ring 26 is screwed within the barrel 24.

As explained above with respect to the embodiment of FIGS. 11 and 11A, the spacer-abutting surface 49 has an orientation at the circular edge contact line ensuring that, in use, an outwardly-directed resulting force is applied to the resilient spacer 40. In some variants, the spacer-abutting surface 49 of the retaining ring 26 has a frustro-spherical profile having a radius of curvature $R_{Ring\_forward}$ given by Equation (5). In other variants, the spacer-abutting surface 49 of the retaining ring 26 has a frustro-conical profile having an inclination angle α with respect to a plane perpendicular to the center axis B of the cavity 32 given by Equation (6).

It will be readily understood that the kit 100a may be provided jointly or separately of the barrel and or the optical element which it is designed to center. In some embodiments, kits 100a of spacers and retaining rings can be offered along with information on the parameters and dimensions of the barrels and optical elements for which the use of such a kit would provide the centering benefits described above.

Figure 12B:
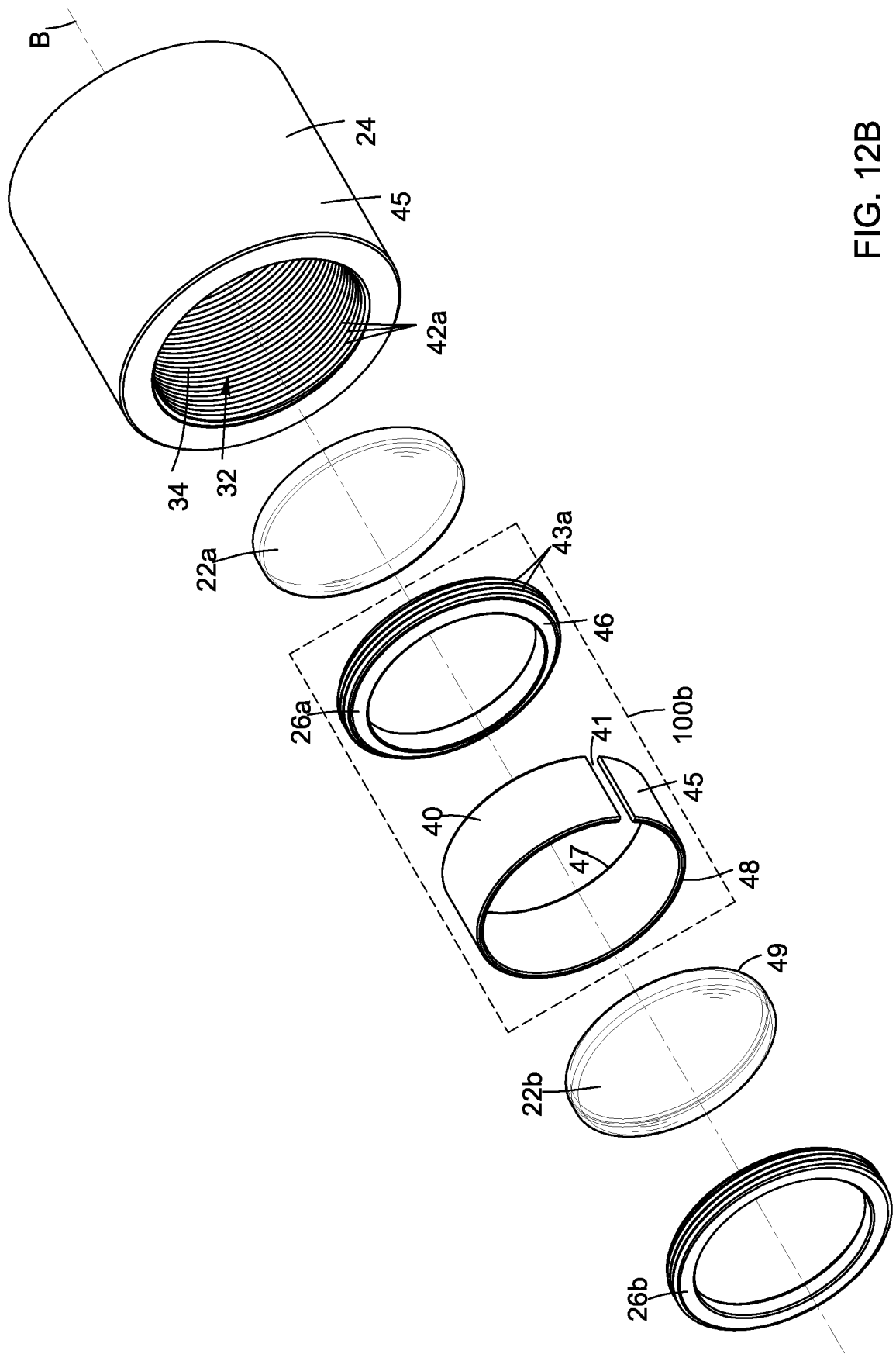

With reference to FIG. 12B, there is shown a kit 100b for mounting first and second optical elements 22a and 22b in a spaced relationship in a barrel 24 having an inner wall 34 and including a cavity 32 having a center axis B, the barrel 24 being provided with a set of barrel threads 42a. It will be readily understood that such a kit may be used to make an assembly such as shown in FIG. 2.

The kit 100b includes a first retaining ring 26a configured for securing the first optical element 22a against a seat provided in the cavity 32. The first retaining ring 26a has a rearward periphery comprising a spacer-mounting surface 46 precisely centered within the cavity 32 when mounted therein. The kit 100b further includes a resilient spacer 40 having a cylindrical wall 45 and opposite frontward and rearward rims 47 and 48. The resilient spacer 40 is resiliently deformable between a compressed state allowing its insertion within the cavity 32, and a biased state in which the cylindrical wall 45 of the resilient spacer 40 contacts the inner wall 34 of the barrel 24. By way of example, the spacer 40 may have a slit 41 extending through a portion of the cylindrical wall 45 along its length.

The frontward rim 47 of the resilient spacer 40 is engageable with the spacer-mounting surface 46 of the first retaining ring 26a along a circular edge contact line;

The rearward rim 48 of the resilient spacer 40 is configured to engage a spacer-abutting surface 49 of the second optical element 22b when the second optical element 22b is inserted in the cavity 32 rearwardly of the resilient spacer 40 and mounted in the cavity using a second retaining ring 26b.

As explained above, the spacer-mounting surface 46 has an orientation at the circular edge contact line ensuring that, in use, an outwardly-directed resulting force is applied to the resilient spacer 40.

Preferably, the first retaining ring 26a has a set of ring threads 43a complementary to a set of barrel threads 42a provided in the cavity 32. As explained above with respect to the embodiment of FIG. 2, in some variants the spacer-mounting surface 46 of the first retaining ring 26a has a frustro-spherical profile having a radius of curvature $R_{Ring\_rear}$ given by the formula of equation (3). In other variants, the spacer-mounting surface 46 of the first retaining ring 26a has a frustro-conical profile having an inclination angle α' with respect to a plane perpendicular to the center axis B of the cavity 32 given by the Equation (4).

It will be readily understood that the kit 100b may be provided jointly or separately of the barrel and/or the optical elements 22a and 22b and the second retaining ring 26b. In some embodiments, kits 100b of spacers and retaining rings can be offered along with information on the parameters and dimensions of the barrels and optical elements for which the use of such a kit would provide the centering benefits described above.

Of course, numerous modifications could be made to the embodiments above without departing from the scope of protection.

The invention claimed is:

1. An optical assembly, comprising:
   a barrel having an inner wall and including a cavity having a center axis;
   a plurality of components mounted sequentially in the cavity of the barrel, the plurality of components comprising, successively:
      a first optical element;
      a first retaining ring affixed to the barrel through a set of ring threads complementary to a set of barrel threads provided in the cavity, the first retaining ring having a rearward periphery comprising a spacer-mounting surface that is precisely centered within the cavity;
      a second optical element, said second element having a forward periphery comprising a spacer-abutting surface;
      a second retaining ring; and
      a resilient spacer provided between the first retaining ring and the second optical element, the resilient spacer having an unthreaded cylindrical wall and opposite frontward and rearward rims in engagement with the spacer-mounting surface and the spacer-abutting surface, respectively, the frontward rim comprising a frontward rim edge engaging the spacer-mounting surface along a circular edge contact line, the resilient spacer being resiliently deformable between a compressed state allowing the insertion thereof within the cavity and a biased state in which the cylindrical wall of the resilient spacer contacts the inner wall of the barrel;
   wherein the first optical element is secured between the first retaining ring and a seat provided in the cavity, and the second optical element is secured between the second retaining ring and the resilient spacer;
   wherein the spacer-mounting surface of the first retaining ring has a frustro-spherical profile having a radius of curvature $R_{Ring\_rear}$ given by the formula:

$$R_{Ring\_rear} = \sqrt{\left[\frac{d_{ring}}{2\tan(\varphi_{threads}/2)} + h' + T/2\right]^2 + Y_{f\_rim}^2}$$

where:
   $d_{ring}$ is a diameter of the first retaining ring along the ring threads;
   $\varphi_{thread}$ is a value of a thread angle of the ring threads;
   $Y_{f\_rim}$ is a half-diameter of the frontward rim edge;
   h' is a distance between (i) a first point of contact of the barrel threads with the ring threads proximate to the resilient spacer and (ii) the circular edge contact line; and
   T is a distance between (i) the first point of contact of the barrel threads with the ring threads proximate to the resilient spacer and (ii) a last point of contact of the barrel threads with the ring threads farthest from the resilient spacer diametrically opposite to the first point of contact; and
wherein a resulting force is applied to the resilient spacer by the engagements of the frontward and rearward rims with the spacer-mounting surface and the spacer-abutting surface, respectively, said resulting force being directed towards the inner wall of the barrel.

2. The optical assembly according to claim 1, wherein the resilient spacer comprises a slit extending through a portion of the cylindrical wall along a length thereof.

3. The optical assembly according to claim 1, wherein the resilient spacer is made of a resilient material selected from the group consisting of metals and plastics.

4. The optical assembly according to claim 1, wherein at least one of the spacer-mounting surface and the spacer-abutting surface is convex.

5. The optical assembly according to claim 1, wherein each one of the spacer-mounting surface and the spacer-abutting surface is convex.

6. A kit for precisely centering an optical element mounted in a barrel having an inner wall and including a cavity having a center axis, the barrel being provided with a set of barrel threads, the kit comprising:
   a resilient spacer having an unthreaded cylindrical wall and opposite frontward and rearward rims, the frontward rim being engageable with a spacer-mounting surface at a rearward periphery of the optical element, the rearward rim comprising a rearward rim edge, the resilient spacer being resiliently deformable between a compressed state allowing the insertion thereof within the cavity and a biased state in which the cylindrical wall of the resilient spacer contacts the inner wall of the barrel; and
   a retaining ring having a set of ring threads complementary to the barrel threads, the retaining ring having a forward periphery comprising a spacer-abutting surface engageable with the rearward rim edge of the rearward rim of the resilient spacer along a circular edge contact line precisely centered within the cavity when the retaining ring is screwed within the barrel, the spacer-abutting surface having a frustro-spherical profile having a radius of curvature $R_{Ring\_forward}$ given by the formula:

$$R_{Ring\_forward} = \sqrt{\left[\frac{d_{ring}}{2\tan(\varphi_{threads}/2)} - h - T/2\right]^2 + Y_{r\_rim}^2}$$

where:
- $d_{ring}$ is a diameter of the retaining ring along the ring threads;
- $\varphi_{thread}$ is a value of a thread angle of the ring threads;
- $Y_{r\_rim}$ is a half-diameter of the rearward rim edge;
- h is a distance, in use, between (i) a first point of contact of the barrel threads with the ring threads proximate to the resilient spacer and (ii) the circular edge contact line; and
- T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact; and wherein the spacer-abutting surface has an orientation at the circular edge contact line ensuring that, in use, a resulting force directed towards the inner wall of the barrel is applied to the resilient spacer.

7. A kit for mounting first and second optical elements in a spaced relationship in a barrel having an inner wall and including a cavity having a center axis, the barrel being provided with a set of barrel threads, the kit comprising:
- a first retaining ring configured for securing the first optical element against a seat provided in the cavity, the first retaining ring having a rearward periphery comprising a spacer-mounting surface precisely centered within the cavity when mounted therein the first retaining ring comprising a set of ring threads complementary to the set of barrel threads; and
- a resilient spacer having an unthreaded cylindrical wall and opposite frontward and rearward rims, the resilient spacer being resiliently deformable between a compressed state allowing the insertion thereof within the cavity and a biased state in which the cylindrical wall of the resilient spacer contacts the inner wall of the barrel, the frontward rim of the resilient spacer comprising a frontward rim edge and being engageable with the spacer-mounting surface of the first retaining ring along a circular edge contact line;

wherein the spacer-mounting surface of the first retaining ring has a frustro-spherical profile having a radius of curvature $R_{Ring\_rear}$ given by the formula:

$$R_{Ring\_rear} = \sqrt{\left[\frac{d_{ring}}{2\tan(\varphi_{threads}/2)} + h' + T/2\right]^2 + Y_{f\_rim}^2}$$

where:
- $d_{ring}$ is a diameter of the first retaining ring along the ring threads;
- $\varphi_{thread}$ is a value of a thread angle of the ring threads;
- $Y_{f\_rim}$ is a half-diameter of the frontward rim edge;
- h' is a distance, in use, between (i) a first point of contact of the barrel threads with the ring threads proximate to the resilient spacer and (ii) the circular edge contact line; and
- T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact;

wherein the rearward rim of the resilient spacer is configured to engage a spacer-abutting surface of the second optical element when the second optical element is inserted in the cavity rearwardly of the resilient spacer and mounted in said cavity using a second retaining ring; and wherein the spacer-mounting surface has an orientation at the circular edge contact line ensuring that, in use, a resulting force directed towards the inner wall of the barrel is applied to the resilient spacer.

8. An optical assembly, comprising:
- a barrel having an inner wall and including a cavity having a center axis;
- a plurality of components mounted sequentially in the cavity of the barrel, the plurality of components comprising, successively:
  - a first optical element;
  - a first retaining ring affixed to the barrel through a set of ring threads complementary to a set of barrel threads provided in the cavity, the first retaining ring having a rearward periphery comprising a spacer-mounting surface that is precisely centered within the cavity;
  - a second optical element, said second element having a forward periphery comprising a spacer-abutting surface;
  - a second retaining ring; and
  - a resilient spacer provided between the first retaining ring and the second optical element, the resilient spacer having an unthreaded cylindrical wall and opposite frontward and rearward rims in engagement with the spacer-mounting surface and the spacer-abutting surface, respectively, the frontward rim comprising a frontward rim edge engaging the spacer-mounting surface along a circular edge contact line, the resilient spacer being resiliently deformable between a compressed state allowing the insertion thereof within the cavity and a biased state in which the cylindrical wall of the resilient spacer contacts the inner wall of the barrel;

wherein the first optical element is secured between the first retaining ring and a seat provided in the cavity, and the second optical element is secured between the second retaining ring and the resilient spacer;

wherein the spacer-mounting surface of the first retaining ring has a frustro-conical profile having an inclination angle $\alpha'$ with respect to a plane perpendicular to the center axis of the cavity given by the formula:

$$\alpha' = \sin^{-1}\left(\frac{Y_{f\_rim}}{\sqrt{\left[\frac{d_{ring}}{2\tan(\varphi_{threads}/2)} + h' + T/2\right]^2 + Y_{f\_rim}^2}}\right)$$

where:
- $Y_{f\_rim}$ is a half-diameter of the frontward rim edge;
- $d_{ring}$ is a diameter of the first retaining ring along the ring threads;
- $\varphi_{thread}$ is a value of a thread angle of the ring threads;
- h' is a distance between (i) a first point of contact of the barrel threads with the ring threads proximate to the resilient spacer and (ii) the circular edge contact line; and
- T is a distance between (i) the first point of contact of the barrel threads with the ring threads proximate to the resilient spacer and (ii) a last point of contact of the barrel threads with the ring threads farthest from the resilient spacer diametrically opposite to the first point of contact; and wherein a resulting force is applied to the resilient spacer by the engagements of the frontward and rearward rims with the spacer-mounting surface and the spacer-abutting surface, respectively, said resulting force being directed towards the inner wall of the barrel.

9. The optical assembly according to claim 8, wherein the resilient spacer comprises a slit extending through a portion of the cylindrical wall along a length thereof.

10. The optical assembly according to claim 8, wherein the resilient spacer is made of a resilient material selected from the group consisting of metals and plastics.

11. The optical assembly according to claim 8, wherein at least one of the spacer-mounting surface and the spacer-abutting surface is convex.

12. The optical assembly according to claim 8, wherein each one of the spacer-mounting surface and the spacer-abutting surface is convex.

13. A kit for precisely centering an optical element mounted in a barrel having an inner wall and including a cavity having a center axis, the barrel being provided with a set of barrel threads, the kit comprising:
- a resilient spacer having an unthreaded cylindrical wall and opposite frontward and rearward rims, the frontward rim being engageable with a spacer-mounting surface at a rearward periphery of the optical element, the rearward rim comprising a rearward rim edge, the resilient spacer being resiliently deformable between a compressed state allowing the insertion thereof within the cavity and a biased state in which the cylindrical wall of the resilient spacer contacts the inner wall of the barrel; and
- a retaining ring having a set of ring threads complementary to the barrel threads, the retaining ring having a forward periphery comprising a spacer-abutting surface engageable with the rearward rim edge of the rearward rim of the resilient spacer along a circular edge contact line precisely centered within the cavity when the retaining ring is screwed within the barrel, the spacer-abutting surface having a frustro-conical profile having an inclination angle α' with respect to a plane perpendicular to the center axis of the cavity given by the formula:

$$\alpha' = \sin^{-1}\left(\frac{Y_{r\_rim}}{\sqrt{\left[\frac{d_{ring}}{2\tan(\varphi_{threads}/2)} - h - T/2\right]^2 + Y_{r\_rim}^2}}\right)$$

where:
- $Y_{r\_rim}$ is a half-diameter of the rearward rim edge;
- $d_{ring}$ is a diameter of the retaining ring along the ring threads;
- $\varphi_{thread}$ is a value of a thread angle of the ring threads;
- h is a distance, in use, between (i) a first point of contact of the barrel threads with the ring threads proximate to the resilient spacer and (ii) the circular edge contact line; and
- T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact; and wherein the spacer-abutting surface has an orientation at the circular edge contact line ensuring that, in use, a resulting force directed towards the inner wall of the barrel is applied to the resilient spacer.

14. A kit for mounting first and second optical elements in a spaced relationship in a barrel having an inner wall and including a cavity having a center axis, the barrel being provided with a set of barrel threads, the kit comprising:
- a first retaining ring configured for securing the first optical element against a seat provided in the cavity, the first retaining ring having a rearward periphery comprising a spacer-mounting surface precisely centered within the cavity when mounted therein, the first retaining ring comprising a set of ring threads complementary to the set of barrel threads; and
- a resilient spacer having an unthreaded cylindrical wall and opposite frontward and rearward rims, the resilient spacer being resiliently deformable between a compressed state allowing the insertion thereof within the cavity and a biased state in which the cylindrical wall of the resilient spacer contacts the inner wall of the barrel, the frontward rim of the resilient spacer comprising a frontward rim edge and being engageable with the spacer-mounting surface of the first retaining ring along a circular edge contact line;

wherein the spacer-mounting surface of the first retaining ring has a frustro-conical profile having an inclination angle α' with respect to a plane perpendicular to the center axis of the cavity given by the formula:

$$\alpha' = \sin^{-1}\left(\frac{Y_{f\_rim}}{\sqrt{\left[\frac{d_{ring}}{2\tan(\varphi_{threads}/2)} + h' + T/2\right]^2 + Y_{f\_rim}^2}}\right)$$

where:
- $Y_{f\_rim}$ is a half-diameter of the frontward rim edge;
- $d_{ring}$ is a diameter of the first retaining ring along the ring threads;
- $\varphi_{thread}$ is a value of a thread angle of the ring threads;
- h' is a distance, in use, between (i) a first point of contact of the barrel threads with the ring threads proximate to the resilient spacer and (ii) the circular edge contact line; and
- T is a distance, in use, between (i) the first point of contact of the barrel threads with the ring threads proximate to the resilient spacer and (ii) a last point of contact of the barrel threads with the ring threads farthest from the resilient spacer diametrically opposite to the first point of contact;

wherein the rearward rim of the resilient spacer is configured to engage a spacer-abutting surface of the second optical element when the second optical element is inserted in the cavity rearwardly of the resilient spacer and mounted in said cavity using a second retaining ring; and wherein the spacer-mounting surface has an orientation at the circular edge contact line ensuring that, in use, a resulting force directed towards the inner wall of the barrel is applied to the resilient spacer.

* * * * *